US009184861B2

(12) United States Patent
Aweya

(10) Patent No.: US 9,184,861 B2
(45) Date of Patent: Nov. 10, 2015

(54) METHOD AND DEVICES FOR SYNCHRONIZATION

(71) Applicants: Khalifa University of Science, Technology, and Research, Abu Dhabi (AE); British Telecommunications plc, London (GB); Emirates Telecommunications Corporation, Abu Dhabi (AE)

(72) Inventor: James Aweya, Abu Dhabi (AE)

(73) Assignees: Khalifa University of Science, Technology, and Research, Abu Dhabi (AE); British Telecommunications PLC, London (GB); Emirates Telecommunications Corporation, Abu Dhabi (AE)

( * ) Notice: Subject to any disclaimer, the term of this patent is extended or adjusted under 35 U.S.C. 154(b) by 161 days.

(21) Appl. No.: 14/043,068

(22) Filed: Oct. 1, 2013

(65) Prior Publication Data

US 2015/0092793 A1 Apr. 2, 2015

(51) Int. Cl.
*H04J 3/06* (2006.01)

(52) U.S. Cl.
CPC ............ *H04J 3/0667* (2013.01); *H04J 3/0685* (2013.01)

(58) Field of Classification Search
USPC ......................................... 370/503, 507, 508
See application file for complete search history.

(56) References Cited

U.S. PATENT DOCUMENTS

| | | | | |
|---|---|---|---|---|
| 7,590,151 B2 * | 9/2009 | Middleton et al. | ............ | 370/516 |
| 2005/0041692 A1 * | 2/2005 | Kallstenius | .................. | 370/503 |
| 2005/0207387 A1 * | 9/2005 | Middleton et al. | ............ | 370/347 |
| 2009/0276542 A1 * | 11/2009 | Aweya et al. | .................. | 709/248 |
| 2010/0158051 A1 | 6/2010 | Hadzic et al. | | |
| 2011/0200051 A1 | 8/2011 | Rivaud et al. | | |
| 2012/0069944 A1 * | 3/2012 | Hadzic et al. | ................. | 375/376 |
| 2012/0155497 A1 * | 6/2012 | Lee et al. | ....................... | 370/507 |
| 2013/0039359 A1 | 2/2013 | Bedrosian | | |
| 2015/0071309 A1 * | 3/2015 | Aweya et al. | ................. | 370/503 |
| 2015/0092793 A1 * | 4/2015 | Aweya | ......................... | 370/503 |
| 2015/0092794 A1 * | 4/2015 | Aweya et al. | ................. | 370/503 |

OTHER PUBLICATIONS

A. J. Van Dierendonck and R. G. Brown, "Relationship between Allan variances and Kalman filter parameters," in Proc. 16th Annual. Precise Time and Time Interval (PTTI) Meeting, Greenbelt, MD, 1984, pp. 273-292.

C. Zucca and P. Tavella, "The clock model and its relationship with the Allan and related variances," IEEE Trans. Ultrason., Ferroelect., Freq. Contr., vol. 52, No. 2, pp. 289-296, 2005.

(Continued)

*Primary Examiner* — Phuongchau Ba Nguyen
(74) *Attorney, Agent, or Firm* — Calfee Halter & Griswold LLP

(57) ABSTRACT

This invention relates to methods and devices for time and frequency synchronization. The invention has particular application where time and frequency synchronization over packet networks using, for example, the IEEE 1588 Precision Time Protocol (PTP) is being carried out. The primary challenge in clock distribution over packet networks is the variable transit delays experienced by timing packets, packet delay variations (PDVs). Embodiments of the invention provide a method for time offset alignment with PDV compensation where a synchronized frequency signal is available at a slave device via Synchronous Ethernet and is used to determine the compensation parameters for the PDV.

18 Claims, 8 Drawing Sheets

(56) References Cited

OTHER PUBLICATIONS

W. Chaffee, "Observability, ensemble averaging and GPS time," IEEE Trans. Aerosp. Electron. Syst., vol. 28, No. 1, pp. 224-240, 1992.

D. W. Allan, "Statistics of atomic frequency standards," Proc. IEEE, vol. 54, No. 2, pp. 221-230, 1966.

Giorgi et al., "Performance Analysis of Kalman-Filter-Based Clock Synchronization in IEEE 1588 Networks", IEEE Transactions on Instrumentation and Measurement, vol. 60, No. 8, Aug. 1, 2011, pp. 2902-2909.

Rodrigues, "IEEE-1588 and Synchronous Ethernet in Telecom", 2007 International IEEE Symposium on Precision Clock Synchronization (ISPCS) for Measurement, Control and Communication, Vienna, Austria, Oct. 1-3, 2007.

International Search Report dated May 9, 2014, for International Application Serial No. PCT/GB2013/052552.

Written Opinion dated May 9, 2014, for International Application Serial No. PCT/GB2013/052552.

* cited by examiner

METHOD AND DEVICES FOR SYNCHRONIZATION

FIELD OF THE INVENTION

The present invention relates to methods and devices for synchronization. It is particularly, but not exclusively, concerned with time synchronization over packet networks using, for example, the IEEE 1588 Precision Time Protocol (PTP) and synchronous Ethernet.

BACKGROUND OF THE INVENTION

There are many applications of high precision time synchronization over packet networks based on packet technologies like IP and Ethernet. Synchronization is a key requirement in telecommunication networks and the telecommunication industry has become a driving force in the development and evolution of synchronization solutions and standards. For example, wireless technologies like GSM, UMTS (both frequency division duplexing (FDD) and time division duplexing (TDD) versions of the UMTS technologies), and CDMA2000 require frequency accuracy of 0.05 ppm (parts per million) at the air interface.

In addition, CDMA2000 requires time synchronization at the ±3 μs level (±10 μs worst case) and UMTS TDD modes (i.e., TD-CDMA and TD-SCDMA) require accuracy off 1.25 μs between base stations. The accurate reference clock is typically derived from Time Division Multiplexing (TDM) interfaces (for GSM, UMTS-FDD (i.e., W-CDMA) and other FDD based technologies) or from expensive GPS receivers located at the base station (for TDD based technologies). In reality, TDD base stations today use GPS and wireless operators have long sought alternative synchronization sources.

Without synchronization traceable to a highly accurate reference clock in the wireless network, local interference between channel frequencies, as well as mutual interference with neighboring base stations will occur. This could ultimately cause calls to be dropped and a degradation of the overall user experience. The high level of synchronization provided by IEEE 1588 PTP could also be useful in time-of-arrival (TOA) and time-difference-of-arrival (TDOA) based localization solutions where one is interested in locating mobile nodes connected to a wireless network.

IEEE 1588 PTP has been designed as an improvement to current methods of synchronization within a distributed network of devices connected to a packet network. It is designed for systems requiring very high accuracies beyond those attainable using Network Time Protocol (NTP). Unlike NTP, IEEE 1588 uses hardware timestamping to deliver timing accuracy well under a microsecond (nanosecond level accuracies). It is also designed for applications that cannot bear the cost of a GPS receiver at each node, or for which GPS signals are inaccessible.

IEEE 1588 PTP can be used for distributing timing information (frequency and time) from a master to one or more slaves. The clock recovery mechanism at a slave will normally have to correct for both frequency and time deviations from the master clock during clock recovery.

Synchronous Ethernet (Sync-E), defined in a suite of ITU-T Recommendations, describes a method for frequency (only) distribution over the physical layer of Ethernet (IEEE 802.3). Since time synchronization requires both frequency and time offset alignment between master and slave clocks, some solutions suggest the combine use of Sync-E and IEEE 1588 PTP where Sync-E provides frequency alignment while IEEE 1588 PTP provides time offset correction.

In this setup of hybrid Sync-E and IEEE 1588 PTP, Sync-E provides perfectly a frequency synchronization signal using Ethernet physical layer frequency transfer, while IEEE 1588 PTP provides time synchronization over the packet network (above the physical layer). With frequency synchronization provided, the only issue here is determining the time offset between slave and master clocks. The time offset should be fixed (a constant) since slave's frequency is aligned to the master's. However, even for time offset determination, the problem here is that IEEE 1588 PTP messages are still exposed to the PDVs inherent in the packet network even though frequency synchronization is available through Sync-E. This is particularly the case if PTP messages are sent end-to-end from master to slave with the intermediate packet network providing no assistance whatsoever (like hop-by-hop Boundary Clocks or Transparent Clocks) to mitigate and compensate for PDV.

PDV therefore still makes time synchronization a challenge even though the frequency synchronization aspect is solved.

A complete IEEE 1588-based solution includes clock recovery (control) algorithms, filters, and PTP-clock based on hardware timer and direct timer access. The IEEE 1588 standards define a wide range of synchronization capabilities except the clock recovery mechanisms (servo algorithm, phase-locked loop (PLL), timers, etc.) to be used at the receiver (slave) to synchronize its local clock to the master. The last pieces are vendor and proprietary solutions and are often product differentiators.

Effects of Packet Delay Variations on Clock Synchronization

PDV is the main factor affecting the accuracy and stability of slave clocks when using packet timing protocols such as IEEE 1588 PTP. Packet network devices such as switches and routers introduce a variable delay to packets (PDV) that inhibits accurate path delay measurements and clock synchronization. Even for techniques that do not require path delay measurements for clock (e.g., frequency) synchronization, the PDV is a direct contributor to the noise in the recovered clock. The PDV inherent in packet networks is a primary source of clock noise. The higher the clock noise, the poorer the clock quality rendering the recovered clock sometimes unusable for end system applications when the noise exceeds application defined thresholds. (The term clock noise here refers to all impairments to the timing information recovered at the slave including jitter, wander, and other imperfections in the recovered clock.)

For instance, for time synchronization, the variation in delay from packet to packet through the network induces noise in the slave's perception of the time at the master. Constant delay (assuming frequency synchronized clocks) would cause a fixed offset, however variable delay causes a varying estimate of the offset. The performance of the slave is affected by both the magnitude of this variation, and how effective the slave's filter is at removing this noise.

Synchronous Ethernet

Clock synchronization methods fall under two broad categories, namely: Layer 1 methods, and Layer 2 and higher methods (Layer 2+) of the OSI model of communication. A schematic of the Layer 1 methods is shown in FIG. 1. A schematic of the Layer 2+ methods is shown in FIG. 2.

The Layer 1 (e.g., Sync-E, PDH, SONET/SDH), and Layer 2+ methods (e.g., NTP, IEEE 1588 PTP) differ mainly in the method used to inject and transport synchronization over the network 2 from a reference clock 1. Layer 1 methods achieve synchronization via the physical layer 4a, 4b bit stream while the Layer 2+ methods do so using higher levels 5a, 5b above the physical layer, for example, via differential clocking mechanisms, processing transmitted clock samples (timestamps) encoded within the packets from a transmitter to a receiver, or processing packet arrival patterns at the receiver to generate timing signals. Layer 1 methods generally support frequency transfer only while Layer 2+ methods support both frequency and time transfer.

ITU-T Recommendations G.8261, G.8262, G.8264 (which define Sync-E) indicate that synchronization can be achieved over Ethernet links by synchronizing the bit clock of the physical layer as is currently done on SONET/SDH links. The clock distribution aspect of Sync-E is essentially native Ethernet equipped with point-to-point distribution of timing signals. By enabling point-to-point distribution of timing signals from an accurate timing reference source, Sync-E aims to bring carrier grade telecom quality clocks to packet networks. Sync-E, unlike IEEE 1588, cannot deliver absolute time (i.e., time-of-day, wall-clock); Sync-E provides frequency distribution only.

The most significant aspect of native Ethernet communications is that the transmitter and receiver clocks are independent (free-running with frequency accuracy not exceeding ±100 parts per million (ppm)) as shown in FIG. 3 and are not synchronized as in TDM networks. In fact, there need be no strict timing relationship between successive frames as individual frames are separated by an idle period or at a minimum an inter-packet gap (IPG). The Ethernet transmitter delimits each packet by a start sequence ("preamble") and a stop sequence ("start-of-idle" or "end-of-stream delimiter"). At the receiver, a clock of the same nominal frequency is recovered and used to clock-in the data to a receive shift register. Only data that are bounded by the correct start and stop bit patterns are accepted.

Sync-E implements timing similar to what is seen in traditional TDM networks (e.g., PDH, SONET/SDH): the physical layer of an Ethernet link is used to deliver timing from one end of the link to the other. Timing transfer is achieved by enslaving the downstream link's Ethernet physical layer clock to the upstream clock. FIG. 4 shows the transmission of frequency from a master 10 to a slave 20. Synchronization is achieved through the use of a digital phase-locked loop (PLL) 6a, 6b in each of the master and slave. The PLL cleans (improves) the incoming clock signal in the slave 20 to filter out jitter and wander and in turn generates the necessary output clock(s), telecom and/or Ethernet clocks, for the receiving interfaces and devices.

FIG. 5 shows the way in which timing transfer is achieved across a sequence of Ethernet nodes 30a-c (although 3 nodes are shown in FIG. 5, it will be appreciated that this configuration can be extended to cover significantly larger networks). Each node has its own crystal oscillator 31 which drives a local clock. The local clock is synchronized to the reference frequency 1 by timing transfer over the physical layer 4 components and the clock signals recovered using the PLL 6a-c as described above. Effectively each node acts as a slave to its neighbour node in the "upstream" direction of the node 30a having the frequency reference 1 and as a master to its neighbour node(s) in the "downstream" direction.

The obvious advantage of this approach is that, by relying on the physical layer only, clock synchronization quality is not influenced by impairments introduced by the upper layers, namely, packet delay variation (PDV), packet losses, and out-of-order arrival of packets at their destinations.

The 10 Mb/s version of Ethernet cannot support Sync-E. In fact, the 10 Mb/s Ethernet (10BASE-T) is not even capable of synchronization signal transmission over the physical layer interface because a 10BASE-T transmitter stops sending pulses during idle periods. A 10BASE-T transmitter simply sends a single pulse, keepalive pulse, every 16 ms to notify its presence to the receiving end. Of course, such infrequent pulses are not sufficient for clock recovery at the receiver. Idle periods in faster Ethernet flavors (100 Mb/s, 1 Gb/s and 10 Gb/s) are continuously filed with pulse transitions, allowing continuous high-quality clock recovery at the receiver and are therefore good candidates for Sync-E.

IEEE 1588 PTP

IEEE 1588 is now the industry accepted packet-based method/standard for synchronization of clocks in distributed systems with accuracies in the nanosecond levels. PTP can be used for both time and frequency synchronization, unlike Sync-E which allows for only frequency synchronization. PTP is a message based protocol that can be implemented across packet based networks including, but not limited to, Ethernet. Its underlying principle is a master/slave concept based on the regular exchange of synchronization messages. IEEE 1588 synchronizes all clocks within a network by allowing clocks to adjust their frequency/time to the highest quality clock (the GrandMaster clock).

IEEE 1588 PTP allows for two different types of timestamping methods, either one-step or two-step. One-step clocks update time information within event messages (Sync and Delay_Req) on-the-fly, while two-step clocks convey the precise timestamps of packets in general messages (Follow_Up and Delay_Resp).

A Sync message is transmitted by a master to its slaves and either contains the exact time of its transmission or is followed by a Follow_Up message containing this time. In a two-step ordinary or boundary clock, the Follow_Up message communicates the value of the departure timestamp for a particular Sync message. A Delay_Req message is a request for the receiving node to return the time at which the Delay_Req message was received, using a Delay_Resp message.

The message exchange pattern for the two-step clock can be explained as follows and is illustrated in FIG. 6. The master 101 sends a Sync message to the slave 103 over the packet network 102 and notes the time $T_1$ at which it was sent. The slave 103 receives the Sync message and notes the time of reception $T_2$. The master 101 conveys to the slave the timestamp $T_1$ by one of two ways: 1) Embedding the timestamp $T_1$ in the Sync message (a one-step clock—not illustrated). This requires some sort of hardware processing (i.e., hardware timestamping) for highest accuracy and precision. 2) Embedding the timestamp $T_1$ in a Follow_Up message (the two-step clock as shown in FIG. 6). Next, the slave 103 sends a Delay_Req message to the master 101 and notes the time $T_3$ at which it was sent. The master 101 receives the Delay_Req message and notes the time of reception $T_4$. The master 101 conveys to the slave 103 the timestamp $T_4$ by embedding it in a Delay_Resp message.

At the end of this PTP message exchange, the slave 103 possesses all four timestamps $\{T_1, T_2, T_3, T_4\}$. These timestamps may be used to compute the offset of the slave's clock 105 with respect to the clock reference 104 in the master 101 and the mean propagation time of messages between the two clocks. The computation of offset and propagation time assumes that the master-to-slave and slave-to-master propagation times are equal—symmetrical communication path.

The present invention aims to provide a method for time offset alignment with IEEE 1588 PTP with PDV compensation.

SUMMARY OF THE INVENTION

An exemplary embodiment of the invention provides a method of synchronising the frequency and time of a slave clock in a slave device to a master clock in a master device, wherein the master device and the slave device are connected by an Ethernet network, the method including the steps of: synchronising the frequency of the slave clock to that of the master clock using Synchronous Ethernet communications between the master device and the slave device; receiving in the slave device first and second timing messages sent from the master device and respective first and second timestamps being the time of sending of the first and second messages according to the master clock, and recording the time of receipt of the first and second messages according to the slave clock; calculating the forward variable delay encountered by the first and second messages in travelling from the master device to the slave device over the network by comparing the difference between the interval between the time of sending of said messages and the interval between the time of receipt of said messages; receiving in the master device third and fourth timing messages sent from the slave device and recording the time of receipt of the third and fourth messages according to the master clock; recording in the slave device the time of sending of the third and fourth messages according to the slave clock, sending the recorded time of receipt of the third and fourth messages to the slave device; calculating the reverse variable delay encountered by the third and fourth messages in travelling from the slave device to the master device over the network by comparing the difference between the interval between the time of sending said messages and the interval between the time of receipt of said messages; calculating, from the forward and reverse variable delays, a measure of the noise associated with both the receipt of the first and second timing messages and receipt of the third and fourth timing messages; estimating the variance of the measurement noise; and adjusting the actual time of the slave clock to synchronize it with the time of the master using the first and third timestamps, the recorded times of receipt of the first and third messages and the estimated variance.

A further exemplary embodiment of the invention provides a slave device connected to a master device having a master clock over an Ethernet network, wherein the slave device includes: a slave clock; an Ethernet adapter; and a processor, wherein: the Ethernet adapter is arranged to receive, at the physical layer, timing signals from the master device via Synchronous Ethernet and the processor synchronises the frequency of the slave clock to the frequency of the master clock using those timing signals; and the Ethernet adapter is arranged to receive, through a layer above the physical layer, first and second timing messages sent from the master device and respective first and second timestamps being the time of sending of the first and second messages according to the master clock, and to record the time of receipt of the first and second messages according to the slave clock; and further wherein the processor is arranged to: calculate the forward variable delay encountered by the first and second messages in travelling from the master device to the slave device over the network by comparing the difference between the interval between the time of sending of said messages and the interval between the time of receipt of said messages; send third and fourth timing messages to the master device for the master device to record the time of receipt of the third and fourth messages according to the master clock; record the time of sending of the third and fourth messages according to the slave clock; receive, from the master device, the recorded time of receipt of the third and fourth messages; calculate the reverse variable delay encountered by the third and fourth messages in travelling from the slave device to the master device over the network by comparing the difference between the interval between the time of sending said messages and the interval between the time of receipt of said messages; calculate, from the forward and reverse variable delays, a measure of the noise associated with both the receipt of the first and second timing messages and receipt of the third and fourth timing messages; estimate the variance of the measurement noise; and adjust the actual time of the slave clock to synchronize it with the time of the master using the first and third timestamps, the recorded times of receipt of the first and third messages and the estimated variance.

A further exemplary embodiment of the present invention provides an apparatus for synchronising the frequency and time of a slave clock in a slave device to a master clock in a master device, the apparatus including: the master device having the master clock and a first Ethernet adapter; the slave device having the slave clock, a second Ethernet adapter and a processor; and an Ethernet network connecting the master device and the slave device, wherein: the first Ethernet adapter is arranged to send, at the physical layer, timing signals based on said master clock using the Synchronous Ethernet protocol; the second Ethernet adapter is arranged to receive, at the physical layer, said timing signals from the master device and the processor synchronises the frequency of the slave clock to the frequency of the master clock using those timing signals; the master device is arranged to send, through the first Ethernet adapter, using a layer above the physical layer, first and second timing messages and respective first and second timestamps being the time of sending of the first and second messages according to the master clock; the second Ethernet adapter is arranged to receive, through a layer above the physical layer, said first and second timing messages and said first and second timestamps, and to record the time of receipt of the first and second messages according to the slave clock; the slave device is arranged to send, through the second Ethernet adapter, using a layer above the physical later, third and fourth timing messages, and to record the time of sending of the third and fourth messages according to the slave clock; the first Ethernet adapter is arranged to receive, through a layer above the physical layer, said third and fourth timing messages and sent from the slave device and to record the time of receipt of the third and fourth messages according to the master clock and send the recorded time of receipt of the third and fourth messages to the slave device; and further wherein the processor in the slave device is arranged to: calculate the forward variable delay encountered by the first and second messages in travelling from the master device to the slave device over the network by comparing the difference between the interval between the time of sending of said messages and the interval between the time of receipt of said messages; calculate the reverse variable delay encountered by the third and fourth messages in travelling from the slave device to the master device over the network by comparing the difference between the interval between the time of sending said messages and the interval between the time of receipt of said messages; calculate, from the forward and reverse variable delays, a measure of the noise associated with both the receipt of the first and second timing messages and receipt of the third and fourth timing messages; estimate the variance of the measurement noise; and adjust the actual time of the slave clock to synchronize it with the time of the master using the first and third timestamps, the recorded times of receipt of the first and third messages and the estimated variance.

BRIEF DESCRIPTION OF THE DRAWINGS

Embodiments of the invention will now be described by way of example with reference to the accompanying drawings in which.

DETAILED DESCRIPTION

Figure 1:
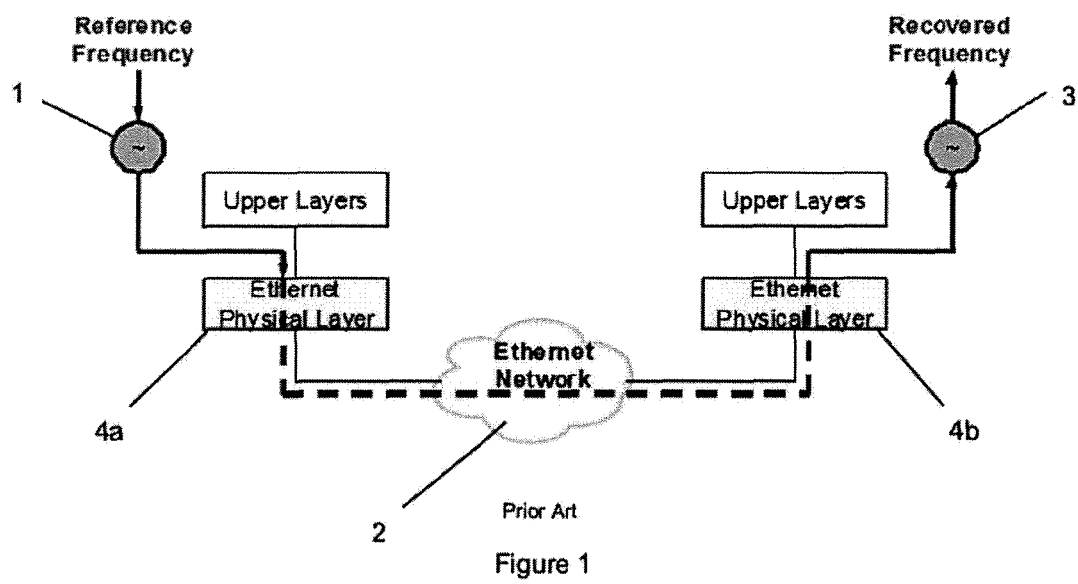
FIG. 1 shows a schematic clock distribution method in which clock synchronisation information is transmitted over physical layer Ethernet and has already been described.
Figure 2:
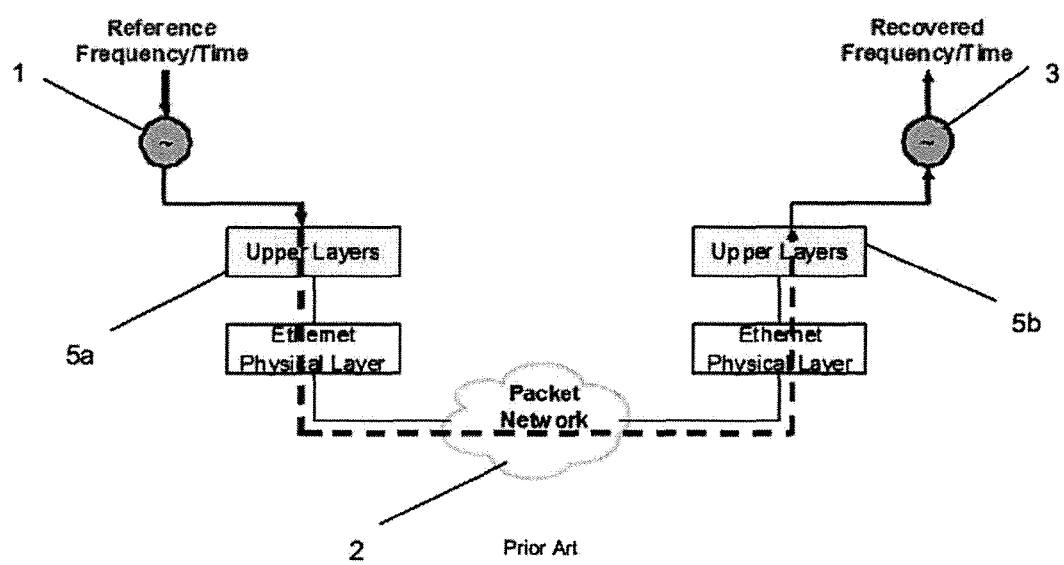
FIG. 2 shows a schematic clock distribution method in which clock synchronisation information is transmitted over upper layer Ethernet and has already been described.
Figure 3:
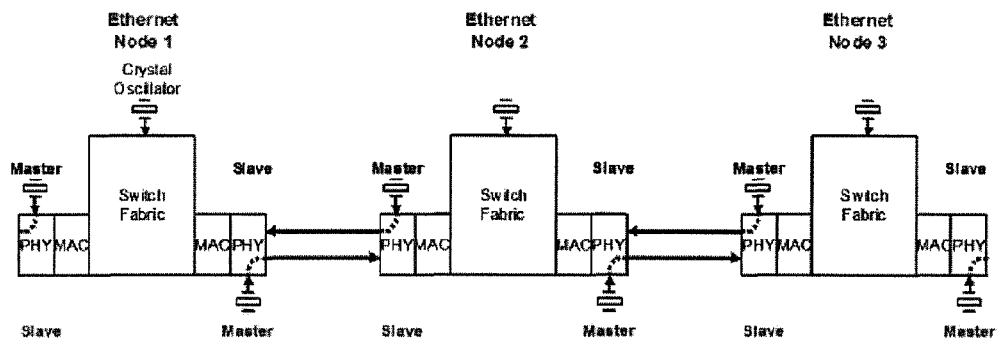
FIG. 3 shows the distribution of timing information in native Ethernet and has already been described.
Figure 4:
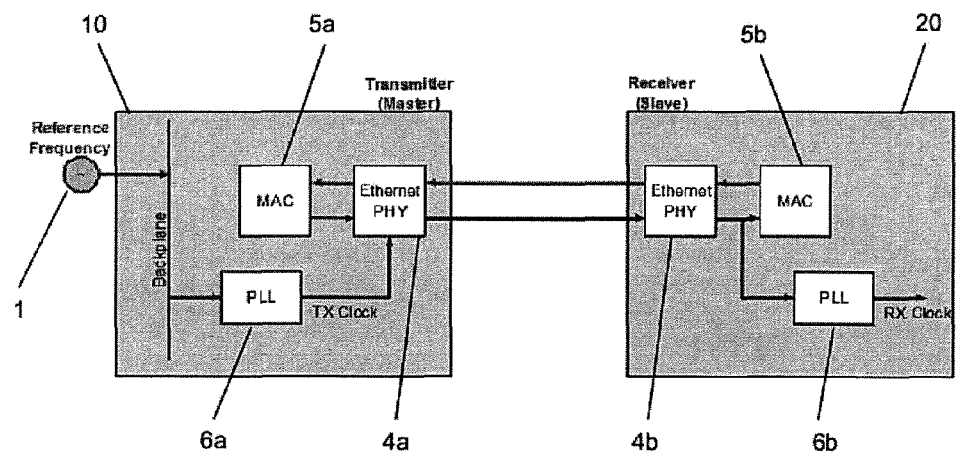
FIG. 4 shows the architecture of a synchronous Ethernet link between a master and a slave and has already been described.
Figure 5:
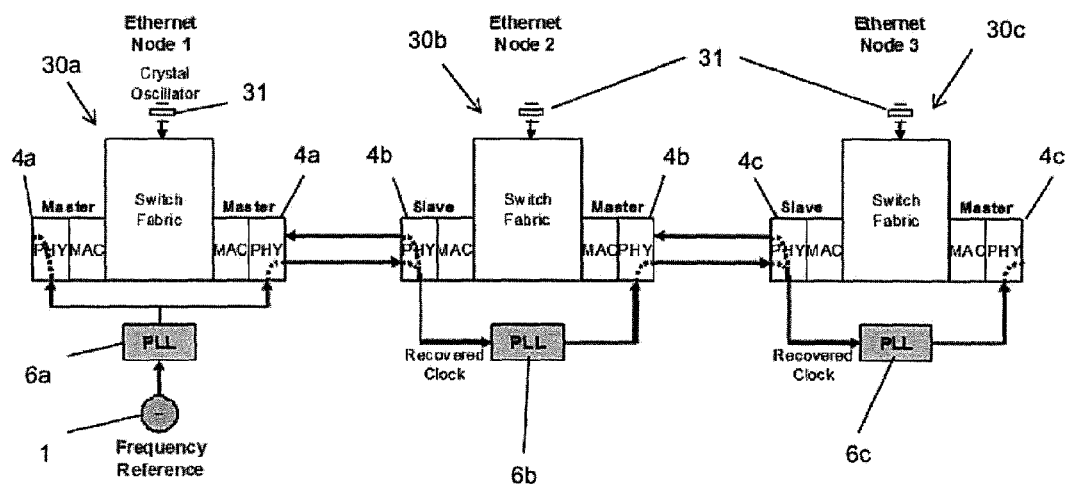
FIG. 5 shows the distribution of timing information using synchronous Ethernet and has already been described.

Accordingly, at their broadest, methods of the present invention provide for synchronising the time and frequency of a clock in a slave device to the time and frequency of a master clock in a master device by using both Synchronous Ethernet communications and additional timing messages.

A first aspect of the present invention provides a method of synchronising the frequency and time of a slave clock in a slave device to a master clock in a master device, wherein the master device and the slave device are connected by an Ethernet network, the method including the steps of: synchronising the frequency of the slave clock to that of the master clock using Synchronous Ethernet communications between the master device and the slave device; receiving in the slave device first and second timing messages sent from the master device and respective first and second timestamps being the time of sending of the first and second messages according to the master clock, and recording the time of receipt of the first and second messages according to the slave clock; calculating the forward variable delay encountered by the first and second messages in travelling from the master device to the slave device over the network by comparing the difference between the interval between the time of sending of said messages and the interval between the time of receipt of said messages; receiving in the master device third and fourth timing messages sent from the slave device and recording the time of receipt of the third and fourth messages according to the master clock; recording in the slave device the time of sending of the third and fourth messages according to the slave clock; sending the recorded time of receipt of the third and fourth messages to the slave device; calculating the reverse variable delay encountered by the third and fourth messages in travelling from the slave device to the master device over the network by comparing the difference between the interval between the time of sending said messages and the interval between the time of receipt of said messages; calculating, from the forward and reverse variable delays, a measure of the noise ("the measurement noise") associated with both the receipt of the first and second timing messages and receipt of the third and fourth timing messages; estimating the variance of the measurement noise; and adjusting the actual time of the slave clock to synchronize it with the time of the master using the first and third timestamps, the recorded times of receipt of the first and third messages and the estimated variance.

The measure of the noise calculated may be referred to herein as "the measurement noise" but need not be an exact measure of the measurement noise in the system. The estimated variance may be an estimate of the variance of the measure of the noise obtained, which is used as an estimate of the variance of the actual measurement noise, or an estimate of the variance of the actual measurement noise which is produced using the measure of the noise.

The method of this aspect can provide a new approach for time synchronization where the frequency synchronization features of Synchronous Ethernet (Sync-E) are used by a slave device to extract certain packet transport measurement parameters which can then be used as an input to a time offset computation mechanism used for clock alignment at the slave.

Time synchronization requires both frequency and time offset alignment between a master and slave clock. In the method of the present aspect, frequency synchronization is provided via Sync-E, so the remaining computation is for the slave clock to determine its time offset from the master clock.

The time offset should be fixed (a constant) since slave's frequency is aligned to the master's. However, even for time offset determination, the problem is that timing messages sent end-to-end over the packet network are still exposed to the packet delay variations (PDVs) inherent in the packet network even though frequency synchronization is available through Sync-E. The PDV inherent in packet networks is a primary source of clock noise. The higher the clock noise, the poorer the clock quality rendering the recovered clock sometimes unusable for end system applications when the noise exceeds application defined thresholds.

Preferably the timing messages are messages according to the IEEE 1588 Precision Time Protocol, and more preferably the first and second timing messages are Sync messages and the third and fourth messages are Delay_Req messages.

The IEEE 1588 Precision Time Protocol (PTP) is a method for distributing high precision timing information (both frequency and time) from a master to one or more slaves over a packet network. In a conventional IEEE 1588 PTP arrangement, the slave then uses a clock recovery mechanism to recover the master clock from this timing information. The primary challenge in clock distribution over packet networks is dealing with the variable transit delays experienced by timing packets, that is, the packet delay variations (PDVs). The clock recovery mechanism at a slave will normally have to correct for both frequency and time deviations from the master clock during clock recovery.

Synchronous Ethernet (Sync-E), defined in a suite of ITU-T Recommendations, provides a method for frequency (only) distribution over the physical layer of Ethernet (IEEE 802.3). Since time synchronization requires both frequency and time offset alignment between master and slave clocks, the method of the present aspect may combine use of Sync-E and IEEE 1588 PTP where Sync-E provides frequency alignment while IEEE 1588 PTP provides time offset correction.

In this arrangement, Sync-E provides a perfect frequency synchronization signal using Ethernet physical layer frequency transfer, while IEEE 1588 PTP provides time synchronization over the packet network (above the physical layer).

However, the IEEE 1588 PTP messages (or other timing messages) are still exposed to the PDVs inherent in the packet network even though frequency synchronization is available through Sync-E. These PDVs still make time synchronization a challenge even though the frequency synchronization aspect is solved. In preferred implementations of the method of this aspect, time offset alignment with IEEE 1588 PTP with PDV compensation is provided where the synchronized frequency signal available at the slave via Sync-E is used to determine the PDV compensation parameters.

By combining features of Sync-E and IEEE 1588 PTP, the method of this aspect may allow the slave to accurately measure the actual PDV of PTP messages arriving at the slave. The slave can then correctly adjust its clock while compensating for the actual delay variations. This may allow the slaves to remove the negative effects that these delay variations cause.

In one implementation of the present aspect, the step of adjusting the actual time of the slave clock uses a linear Kalman filter to update a state equation representing the offset and skew of the slave clock compared to the master clock using the estimated variance of the measurement noise following receipt of each timing message in the slave device.

Practical implementation of the Kalman filter typically requires getting a good estimate of the process noise and measurement noise covariances. In the method of the present aspect, the frequency synchronization features of Sync-E can be used to extract accurately the PDV parameters from the PTP message flows to the slave. The PDV parameters can then be used to determine the measurement noise covariances for the Kalman filter.

In a development of this implementation, the method may further include the steps of, prior to adjusting the actual time of the slave clock, determining the skew of the slave clock according to the updated state equation, and only proceeding to adjust the actual time of the slave clock based on the updated state equation if the skew is less than a predetermined level.

As the slave clock is already frequency synchronized to the master clock via Sync-E, a further advantageous feature of using the Kalman filter model is that it can provide for computation of the frequency offset ($\alpha_n$) as well. The computation of this variable from the Kalman filter can then be used to verify how good the Kalman filtering estimate of the time offset is, that is, when the time offset estimate is good enough to be used for clock alignment by the slave. This is on the basis that if the Kalman filter computes a significant frequency offset when the clocks are known to be frequency synchronised via Sync-E, then it is highly likely that the time offset computation will suffer from similar error and so should not be used to update the local clock in the slave device.

Preferably the step of estimating the variance of the measurement noise calculates a running variance in a recursive manner using the previous estimate of the variance and the calculated measurement noise.

Calculating the variance of a large set of numbers, particularly from real-time data, is not a trivial exercise. For clock data of the type being processed by the method of this aspect, the data set may include millions of numbers. Accordingly, by calculating a running variance in a recursive manner greatly simplifies the process and reduces the processing power required to perform this step. In a particularly preferred embodiment, the estimation of the variance only involves the previous estimate of the variance and the data from the last sample received.

In a development of the method of the present aspect the method may further include the step of, prior to steps of estimating the variance of the measurement noise and adjusting the actual time of the slave clock, screening out data having unusually large measurement noise.

This development of the present aspect provides a packet pre-processing technique (that can be used with the Kalman filtering estimation described above, or any other time synchronization technique) to screen out packets with excessive PDVs which, when used could cause overreaction to measurements.

The method of the present aspect may include any combination of some, all or none of the above described preferred and optional features.

The methods of the above aspect is preferably implemented by a slave device according to the second aspect of this invention or in a system according to the third aspect of this invention, as described below, but need not be.

Further aspects of the present invention include computer for running on computer systems which carry out the methods of the above aspect, including some, all or none of the preferred and optional features of that aspect.

At their broadest, slave devices of the present invention are arranged to synchronise the frequency and time of their local clock with a master clock by using both Synchronous Ethernet communications and additional timing messages.

A second aspect of the present invention provides a slave device connected to a master device having a master clock over an Ethernet network, wherein the slave device includes: a slave clock; an Ethernet adapter; and a processor, wherein: the Ethernet adapter is arranged to receive, at the physical layer, timing signals from the master device via Synchronous Ethernet and the processor synchronises the frequency of the slave clock to the frequency of the master clock using those timing signals; and the Ethernet adapter is arranged to receive, through a layer above the physical layer, first and second timing messages sent from the master device and respective first and second timestamps being the time of sending of the first and second messages according to the master clock, and to record the time of receipt of the first and second messages according to the slave clock; and further wherein the processor is arranged to: calculate the forward variable delay encountered by the first and second messages in travelling from the master device to the slave device over the network by comparing the difference between the interval between the time of sending of said messages and the interval between the time of receipt of said messages; send third and fourth timing messages to the master device for the master device to record the time of receipt of the third and fourth messages according to the master clock; record the time of sending of the third and fourth messages according to the slave clock, receive, from the master device, the recorded time of receipt of the third and fourth messages; calculate the reverse variable delay encountered by the third and fourth messages in travelling from the slave device to the master device over the network by comparing the difference between the interval between the time of sending said messages and the interval between the time of receipt of said messages; calculate, from the forward and reverse variable delays, a measure of the noise ("the measurement noise") associated with both the receipt of the first and second timing messages and receipt of the third and fourth timing messages; estimate the variance of the measurement noise; and adjust the actual time of the slave clock to synchronize it with the time of the master using the first and third timestamps, the recorded times of receipt of the first and third messages and the estimated variance.

The measure of the noise calculated may be referred to herein as "the measurement noise" but need not be an exact measure of the measurement noise in the system. The estimated variance may be an estimate of the variance of the measure of the noise obtained, which is used as an estimate of the variance of the actual measurement noise, or an estimate of the variance of the actual measurement noise which is produced using the measure of the noise.

The device of this aspect makes use of a new approach for time synchronization where the frequency synchronization features of Synchronous Ethernet (Sync-E) are used by a slave device to extract certain packet transport measurement parameters which can then be used as an input to a time offset computation mechanism used for clock alignment at the slave.

Time synchronization requires both frequency and time offset alignment between a master and slave clock. In the method of the present aspect, frequency synchronization is provided via Sync-E, so the remaining computation is for the slave clock to determine its time offset from the master clock.

The time offset should be fixed (a constant) since slave's frequency is aligned to the master's. However, even for time offset determination, the problem is that timing messages sent end-to-end over the packet network are still exposed to the packet delay variations (PDVs) inherent in the packet network even though frequency synchronization is available through Sync-E. The PDV inherent in packet networks is a primary source of clock noise. The higher the clock noise, the poorer the clock quality rendering the recovered clock sometimes unusable for end system applications when the noise exceeds application defined thresholds.

Preferably the timing messages are messages according to the IEEE 1588 Precision Time Protocol, and more preferably the first and second timing messages are Sync messages and the third and fourth messages are Delay_Req messages.

The IEEE 1588 Precision Time Protocol (PTP) is a method for distributing high precision timing information (both frequency and time) from a master to one or more slaves over a packet network. In a conventional IEEE 1588 PTP arrangement, the slave then uses a clock recovery mechanism to recover the master clock from this timing information. The primary challenge in clock distribution over packet networks is dealing with the variable transit delays experienced by timing packets, that is, the packet delay variations (PDVs). The clock recovery mechanism at a slave will normally have to correct for both frequency and time deviations from the master clock during clock recovery.

Synchronous Ethernet (Sync-E), defined in a suite of ITU-T Recommendations, provides a method for frequency (only) distribution over the physical layer of Ethernet (IEEE 802.3). Since time synchronization requires both frequency and time offset alignment between master and slave clocks, the slave device of the present aspect may combine use of Sync-E and IEEE 1588 PTP where Sync-E provides frequency alignment while IEEE 1588 PTP provides time offset correction.

In this arrangement, Sync-E provides a perfect frequency synchronization signal using Ethernet physical layer frequency transfer, while IEEE 1588 PTP provides time synchronization over the packet network (above the physical layer).

However, the IEEE 1588 PTP messages (or other timing messages) are still exposed to the PDVs inherent in the packet network even though frequency synchronization is available through Sync-E. These PDVs still make time synchronization a challenge even though the frequency synchronization aspect is solved. In preferred implementations of the method of this aspect, time offset alignment with IEEE 1588 PTP with PDV compensation is provided where the synchronized frequency signal available at the slave via Sync-E is used to determine the PDV compensation parameters.

By combining features of Sync-E and IEEE 1588 PTP, the slave device of this aspect may be able to accurately measure the actual PDV of PTP messages arriving at the slave. The slave can then correctly adjust its clock while compensating for the actual delay variations. This may allow the slave to remove the negative effects that these delay variations cause.

In one implementation of the present aspect, the processor adjusts the actual time of the slave clock by using a linear Kalman filter to update a state equation representing the offset and skew of the slave clock compared to the master clock using the estimated variance of the measurement noise following receipt of each timing message in the slave device.

Practical implementation of the Kalman filter typically requires getting a good estimate of the process noise and measurement noise covariances. In the slave device of the present aspect, the frequency synchronization features of Sync-E can be used to extract accurately the PDV parameters from the PTP message flows to the slave. The PDV parameters can then be used to determine the measurement noise covariances for the Kalman filter.

In a development of this implementation, the processor determines the skew of the slave clock according to the updated state equation, and only adjusts the actual time of the slave clock based on the updated state equation if the skew is less than a predetermined level.

As the slave clock is already frequency synchronized to the master clock via Sync-E, a further advantageous feature of using the Kalman filter model is that it can provide for computation of the frequency offset ($\alpha_n$) as well. The computation of this variable from the Kalman filter can then be used to verify how good the Kalman filtering estimate of the time offset is, that is, when the time offset estimate is good enough to be used for clock alignment by the slave. This is on the basis that if the Kalman filter computes a significant frequency offset when the clocks are known to be frequency synchronised via Sync-E, then it is highly likely that the time offset computation will suffer from similar error and so should not be used to update the local clock in the slave device.

Preferably the processor estimates the variance of the measurement noise by calculating a running variance in a recursive manner using the previous estimate of the variance and the calculated measurement noise.

Calculating the variance of a large set of numbers, particularly from real-time data, is not a trivial exercise. For clock data of the type being processed by the method of this aspect, the data set may include millions of numbers. Accordingly, by calculating a running variance in a recursive manner greatly simplifies the process and reduces the processing power required to perform this step. In a particularly preferred embodiment, the estimation of the variance only involves the previous estimate of the variance and the data from the last sample received.

In a development of the present aspect, the processor screens out data having unusually large measurement noise prior to making its estimate of the variance of the measurement noise and adjusting the actual time of the slave clock.

This development of the present aspect provides a packet pre-processing technique (that can be used with the Kalman filtering estimation described above, or any other time synchronization technique) to screen out packets with excessive PDVs which, when used could cause overreaction to measurements.

The slave device of this aspect preferably operates by carrying out the relevant steps of a method according to the above described first aspect.

The slave device of the present aspect may include any combination of some, all or none of the above described preferred and optional features.

At their broadest, systems of the present invention provide for frequency and time synchronisation between a master and slave device by using both Synchronous Ethernet communications and additional timing messages.

A third aspect of the present invention provides a system for synchronising the frequency and time of a slave clock in a slave device to a master clock in a master device, the system including: the master device having the master clock and a first Ethernet adapter; the slave device having the slave clock, a second Ethernet adapter and a processor; and an Ethernet network connecting the master device and the slave device, wherein: the first Ethernet adapter is arranged to send, at the physical layer, timing signals based on said master clock using the Synchronous Ethernet protocol; the second Ethernet adapter is arranged to receive, at the physical layer, said timing signals from the master device and the processor synchronises the frequency of the slave clock to the frequency of the master clock using those timing signals; the master device is arranged to send, through the first Ethernet adapter, using a layer above the physical layer, first and second timing messages and respective first and second timestamps being the time of sending of the first and second messages according to the master clock; the second Ethernet adapter is arranged to receive, through a layer above the physical layer, said first and second timing messages and said first and second timestamps, and to record the time of receipt of the first and second messages according to the slave clock; the slave device is arranged to send, through the second Ethernet adapter, using a layer above the physical later, third and fourth timing messages, and to record the time of sending of the third and fourth messages according to the slave clock; the first Ethernet adapter is arranged to receive, through a layer above the physical layer, said third and fourth timing messages and sent from the slave device and to record the time of receipt of the third and fourth messages according to the master clock and send the recorded time of receipt of the third and fourth messages to the slave device; and further wherein the processor in the slave device is arranged to: calculate the forward variable delay encountered by the first and second messages in travelling from the master device to the slave device over the network by comparing the difference between the interval between the time of sending of said messages and the interval between the time of receipt of said messages; calculate the reverse variable delay encountered by the third and fourth messages in travelling from the slave device to the master device over the network by comparing the difference between the interval between the time of sending said messages and the interval between the time of receipt of said messages; calculate, from the forward and reverse variable delays, a measure of the noise associated with both the receipt of the first and second timing messages and receipt of the third and fourth timing messages; estimate the variance of the measurement noise; and adjust the actual time of the slave clock to synchronize it with the time of the master using the first and third timestamps, the recorded times of receipt of the first and third messages and the estimated variance.

The measure of the noise calculated may be referred to herein as "the measurement noise" but need not be an exact measure of the measurement noise in the system. The estimated variance may be an estimate of the variance of the measure of the noise obtained, which is used as an estimate of the variance of the actual measurement noise, or an estimate of the variance of the actual measurement noise which is produced using the measure of the noise.

The system of this aspect makes use of a new approach for time synchronization where the frequency synchronization features of Synchronous Ethernet (Sync-E) are used by a slave device to extract certain packet transport measurement parameters which can then be used as an input to a time offset computation mechanism used for clock alignment at the slave.

Time synchronization requires both frequency and time offset alignment between a master and slave clock. In the system of the present aspect, frequency synchronization is provided via Sync-E, so the remaining computation is for the slave clock to determine its time offset from the master clock.

The time offset should be fixed (a constant) since slave's frequency is aligned to the master's. However, even for time offset determination, the problem is that timing messages sent end-to-end over the packet network are still exposed to the packet delay variations (PDVs) inherent in the packet network even though frequency synchronization is available through Sync-E. The PDV inherent in packet networks is a primary source of clock noise. The higher the clock noise, the poorer the clock quality rendering the recovered clock sometimes unusable for end system applications when the noise exceeds application defined thresholds.

Preferably the timing messages are messages according to the IEEE 1588 Precision Time Protocol, and more preferably the first and second timing messages are Sync messages and the third and fourth messages are Delay_Req messages.

The IEEE 1588 Precision Time Protocol (PTP) is a method for distributing high precision timing information (both frequency and time) from a master to one or more slaves over a packet network. In a conventional IEEE 1588 PTP arrangement, the slave then uses a clock recovery mechanism to recover the master clock from this timing information. The primary challenge in clock distribution over packet networks is dealing with the variable transit delays experienced by timing packets, that is, the packet delay variations (PDVs). The clock recovery mechanism at a slave will normally have to correct for both frequency and time deviations from the master clock during clock recovery.

Synchronous Ethernet (Sync-E), defined in a suite of ITU-T Recommendations, provides a method for frequency (only) distribution over the physical layer of Ethernet (IEEE 802.3). Since time synchronization requires both frequency and time offset alignment between master and slave clocks, the system of the present aspect may combine use of Sync-E and IEEE 1588 PTP where Sync-E provides frequency alignment while IEEE 1588 PTP provides time offset correction.

In this arrangement, Sync-E provides a perfect frequency synchronization signal using Ethernet physical layer frequency transfer, while IEEE 1588 PTP provides time synchronization over the packet network (above the physical layer).

However, the IEEE 1588 PTP messages (or other timing messages) are still exposed to the PDVs inherent in the packet network even though frequency synchronization is available through Sync-E. These PDVs still make time synchronization a challenge even though the frequency synchronization aspect is solved. In preferred implementations of the method of this aspect, time offset alignment with IEEE 1588 PTP with PDV compensation is provided where the synchronized frequency signal available at the slave via Sync-E is used to determine the PDV compensation parameters.

By combining features of Sync-E and IEEE 1588 PTP, the system of this aspect may be able to accurately measure the actual PDV of PTP messages arriving at the slave. The slave can then correctly adjust its clock while compensating for the actual delay variations. This may allow the slave to remove the negative effects that these delay variations cause.

In one implementation of the present aspect, the processor in the slave device adjusts the actual time of the slave clock by using a linear Kalman filter to update a state equation representing the offset and skew of the slave clock compared to the master clock using the estimated variance of the measurement noise following receipt of each timing message in the slave device.

Practical implementation of the Kalman filter typically requires getting a good estimate of the process noise and measurement noise covariances. In the slave device of the present aspect, the frequency synchronization features of Sync-E can be used to extract accurately the PDV parameters from the PTP message flows to the slave. The PDV parameters can then be used to determine the measurement noise covariances for the Kalman filter.

In a development of this implementation, the processor determines the skew of the slave clock according to the updated state equation, and only adjusts the actual time of the slave clock based on the updated state equation if the skew is less than a predetermined level.

As the slave clock is already frequency synchronized to the master clock via Sync-E, a further advantageous feature of using the Kalman filter model is that it can provide for computation of the frequency offset ($\alpha_n$) as well. The computation of this variable from the Kalman filter can then be used to verify how good the Kalman filtering estimate of the time offset is, that is, when the time offset estimate is good enough to be used for clock alignment by the slave. This is on the basis that if the Kalman filter computes a significant frequency offset when the clocks are known to be frequency synchronised via Sync-E, then it is highly likely that the time offset computation will suffer from similar error and so should not be used to update the local clock in the slave device.

Preferably the processor estimates the variance of the measurement noise by calculating a running variance in a recursive manner using the previous estimate of the variance and the calculated measurement noise.

Calculating the variance of a large set of numbers, particularly from real-time data, is not a trivial exercise. For clock data of the type being processed by the method of this aspect, the data set may include millions of numbers. Accordingly, by calculating a running variance in a recursive manner greatly simplifies the process and reduces the processing power required to perform this step. In a particularly preferred embodiment, the estimation of the variance only involves the previous estimate of the variance and the data from the last sample received.

In a development of the present aspect, the processor screens out data having unusually large measurement noise prior to making its estimate of the variance of the measurement noise and adjusting the actual time of the slave clock.

This development of the present aspect provides a packet pre-processing technique (that can be used with the Kalman filtering estimation described above, or any other time synchronization technique) to screen out packets with excessive PDVs which, when used could cause overreaction to measurements.

The system of this aspect preferably operates by carrying out a method according to the above described first aspect.

The system of the present aspect may include any combination of some, all or none of the above described preferred and optional features.

Figure 7:
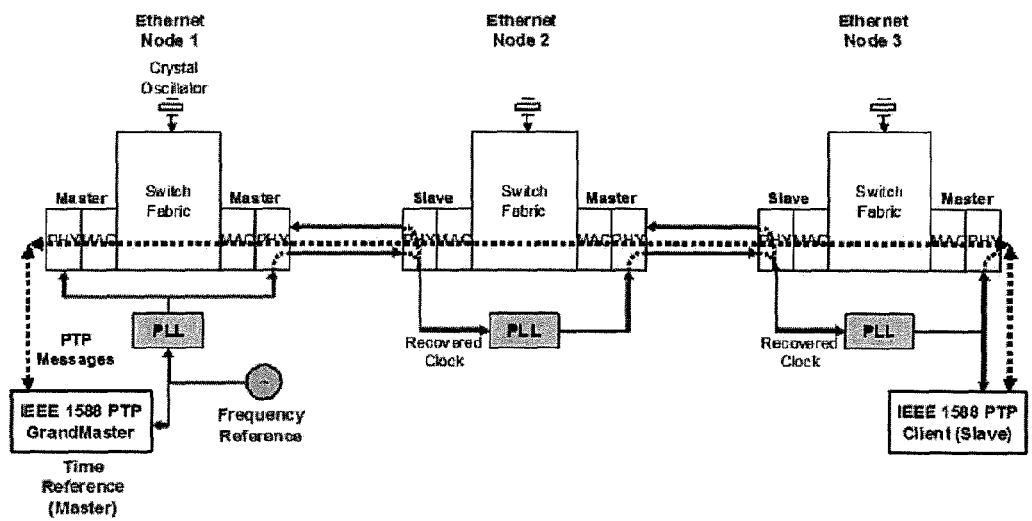
FIG. 7 shows, in schematic form, the distribution of timing information according to an embodiment of the present invention.

IEEE 1588 PTP supports both time and frequency synchronization but Sync-E supports high quality frequency synchronization only (at SONET/SDH level quality). The key attributes of the two techniques are given in Table 1 below. Some operators are planning widespread deployment of Sync-E because of its accuracy and SONET/SDH like management capabilities which operators are already very familiar with. The advantages of both PTP and Sync-E have been recognized in the industry and it has been suggested that combining PTP and Sync-E can offer better performance than PTP alone. This allows applications that need time (e.g., TDD wireless technologies) to tap from PTP and those that need frequency (e.g., FDD wireless technologies, circuit emulation services (CES)) to tap from Sync-E. Applications like billing and SLA (service level agreements) can benefit from a network that is supports the time-of-day. The key benefit is both PTP and Sync-E can be used independently or in combination to address the synchronization needs of the network as shown in FIG. 7.

TABLE 1

Sync-E vs. IEEE 1588 PTP

| Sync-E | IEEE 1588 PTP |
|---|---|
| Uses the physical layer of Ethernet | Independent of the physical layer |
| Can only distribute frequency - it cannot distribute time-of-day | Can distribute both time-of-day and frequency |
| It is not affected by impairments (PDV, packet loss, out of order) introduced by the higher levels of the network protocols | Can be affected by impairments of the packet network such as PDV |

Development of the Clock Offset and Skew Model

Let $\theta$ and $\alpha$ be the clock offset and skew (or normalized frequency deviation), respectively, between a master clock and a slave clock. Below some generalized clock offset and skew equations are set out that will be used in the synchronization solution discussed in more detail later.

Figure 8:
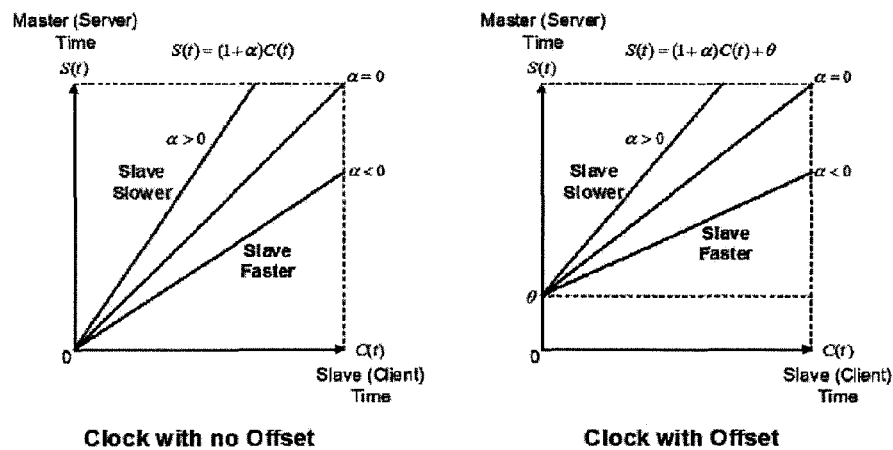
FIG. 8 shows simple models of the effect of clock skew on clocks with and without offset.

At any particular time instant, a snapshot (i.e., instantaneous view) of the relationship between the master (server) clock with timeline S(t) and the slave (client) clock with timeline C(t), can be described by the well-know simple skew clock model depicted in FIG. 8, and described by the equation, $$S(t)=(1+\alpha)C(t)+\theta, \quad (1)$$

where $\alpha$ is a very small quantity in the order of parts-per-million. This snapshot is an instantaneous view of how well the two clocks are (mis)aligned. FIG. 8 explains very well the influence of $\theta$ and $\alpha$ on the alignment. The above equation can be extended to account for the case where the master clock and slave clock exchange messages over a communication link with delay.

Figure 6:
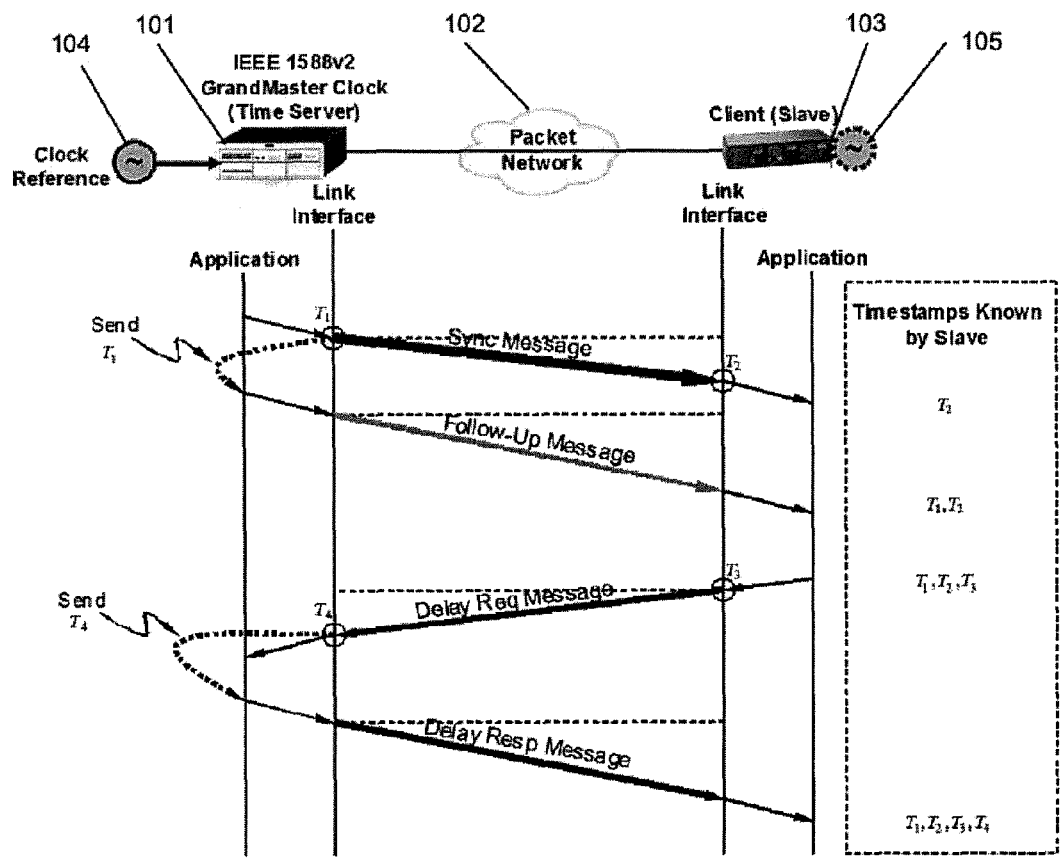
FIG. 6 shows the message flow in a two-step clock under IEEE 1588 PTP and has already been described.

Assume that a Sync message travelling from a master to a slave experiences a fixed delay d plus a variable (stochastic) delay $\epsilon$. Similarly, assume that a Delay_Req message sent from the slave to the master experiences a fixed delay of d and a variable delay $\gamma$. It is further assumed that the fixed delay components in both directions are equal (symmetric communication paths) but the messages experience variable delays such queuing delays. The master 101 and slave 103 exchange messages using the delay-request delay-response mechanism described in FIG. 6 and also illustrated in FIG. 9. In this system events are logged in discrete time instants n= 0, 1, 2, 3, . . . , with each discrete steps is equal to a small interval (sampling) of Δt seconds.

For the nth Sync message (see FIG. 6) which departs with timestamp $T_{1,n} \in S(t)$ and arrives with timestamp $T_{2,n} \in C(t)$ after having experienced a fixed delay d and a variable delay $\epsilon_n$, the simple skew clock model above can be extended to account for the travel time $d+\epsilon_n$ to obtain the following expression $$(T_{1,n}+d+\epsilon_n)=(1+\alpha_n)T_{2,n}+\theta_n \qquad (2)$$

The variables $\theta_n$ and $\alpha_n$ are the offset and skew during the nth Sync message exchange.

For the nth Delay_Req message which departs with timestamp $T_{3,n} \in C(t)$ and arrives with timestamp $T_{4,n} \in S(t)$ after having experienced a fixed delay d and a variable delay $\gamma_n$, the following expression is obtained $$T_{4,n}-d-\gamma_n=(1+\alpha_n)T_{3,n}+\theta_n \qquad (3)$$

Adding (2) and (3) gives $$T_{1,n}+T_{4,n}+\epsilon_n-\gamma_n=(1+\alpha_n)(T_{2,n}+T_{3,n})+2\theta_n$$

$$(T_{1,n}-T_{2,n})+(T_{4,n}-T_{3,n})=2\theta_n+\alpha_n(T_{2,n}+T_{3,n})+(\gamma_n-\epsilon_n) \qquad (4)$$

The expression above can be rewritten as $$\underbrace{(T_{1,n}-T_{2,n})+(T_{4,n}-T_{3,n})}_{y_n}=2\theta_n+\underbrace{\alpha_n(T_{2,n}+T_{3,n})}_{D_n X_n}+\underbrace{(\gamma_n-\varepsilon_n)}_{v_n} \qquad (5)$$

where n is a nonnegative time index, $y_n=(T_{1,n}-T_{2,n})+(T_{4,n}-T_{3,n})$ is a scalar, $D_n=[2(T_{2,n}+T_{3,n})]$ is a vector, $X_n^T=[\theta_n \; \alpha_n]$ is a vector, and $v_n=(\gamma_n-\epsilon_n)$ is the measurement noise. The nth sampling interval is considered to be the period in which the nth Sync and nth Delay_Req messages exchanges occur. The clock offset can be expressed from (4) as follows $$\theta_n = -\left[\frac{(T_{2,n}-T_{1,n})-(T_{4,n}-T_{3,n})}{2}\right] - \frac{\alpha_n(T_{2,n}+T_{3,n})}{2} - \frac{(\gamma_n-\varepsilon_n)}{2} \qquad (6)$$

It can be seen from this equation that for a system with zero skew and no noise, the clock offset simplifies to the classic offset equation $$\theta_n = -\left[\frac{(T_{2,n}-T_{1,n})-(T_{4,n}-T_{3,n})}{2}\right] \qquad (7)$$

The above equation can be derived without the minus sign when the clock model $C(t)=(1+\alpha)S(t)+\theta$ is used instead. Either way, the same classic offset equation can be derived.

Discrete-Time Linear Kalman Filter Model

It is assumed that the true process dynamics are described by the following linear transition equation $$X_n=A_n X_{n-1}+B_n U_n+w_n, \qquad (8)$$

where $X_n$ is an M-dimensional vector of state variables, $A_n$ is an M×M transition matrix, $B_n$ is an M×M control-input model matrix which is applied to the M-dimensional control vector $U_n$, and $w_n$ is an M-dimensional process noise vector which is assumed to be drawn from a zero mean multivariate normal distribution with covariance $Q_n=E[w_n w_n^T]$, $w_n \sim N(0,Q_n)$, and T denotes transpose. In the present estimation problem, the $B_n U_n$ term is not applicable and so is ignored, resulting in the following state equation $$X_n=A_n X_{n-1}+w_n \qquad (9)$$

The one-step estimate (predicted (a priori) state estimate) is given by $$\hat{X}_{n,n-1}=A_n \hat{X}_{n-1,n-1}, \qquad (10)$$

where, in general $\hat{X}_{n,n-1}$ is an estimate of $X_n$ given data $y_1 \ldots, y_{n-1}$ in periods 1 through n−1, where $y_n$ is an observed variable in period n. The relations that distinguish the Kalman filter model and associated computational procedures from other linear estimation techniques are the particular model relating $X_n$ to $y_n$ and the algorithm for computing $\hat{X}_{n,n}$. The 1×M matrix $D_n$ defines the relationship between $y_n$ and $X_n$ as $$y_n=D_n X_n+v_n, \qquad (11)$$

where $v_n$ is the measurement noise which is assumed to be zero mean Gaussian white noise with covariance $R_n=E[v_n v_n^T]$, $v_n \sim N(0,R_n)$. At time n, the vector $\hat{X}_{n,n}$ is computed by $$\hat{X}_{n,n}=\hat{X}_{n,n-1}+K_n \tilde{z}_n=\hat{X}_{n,n-1}+K_n(y_n-D_n \hat{X}_{n,n-1}). \qquad (12)$$

This is called the updated (a posteriori) state estimate. The M×1 Kalman gain matrix $K_n$ can be calculated recursively by the following equations:

Predicted Error Covariance Matrix:

$$P_{n,n-1}=A_n P_{n-1,n-1} A_n^T+Q_n \qquad (13)$$

Innovation (or Residual) Covariance Matrix:

$$S_n=D_n P_{n,n-1} D_n^T+R_n \qquad (14)$$

Optimal Kalman Gain:

$$K_n=P_{n,n-1} D_n^T S_n^{-1}=P_{n,n-1} D_n^T [D_n P_{n,n-1} D_n^T+R_n]^{-1} \qquad (15)$$

Updated Error Covariance Matrix:

$$P_{n,n}=(I-K_n D_n)P_{n,n-1} \qquad (16)$$

It is assumed that $E[v_n]=E[w_n]=0$ for all n, $E[w_n v_i^T]=0$ for all (n,i), $E[w_n w_i^T]=0$ for all n≠i, and $E[v_n v_i^T]=0$ for all n≠i.

From (12), it can be seen that the vector $\hat{X}_n$ which is the estimate of $X_n$ is derived as the previous one-step estimation $\hat{X}_{n,n-1}$, plus a linear combination (weighting) of the differences between the measurement $y_n$ and the previous estimate of these measurements $D\hat{X}_{n,n-1}$. The weights assigned to the difference terms are appropriate components of the gain matrix $K_n$. It is also important to note that $\hat{X}_{n,n}$ depends on $\hat{X}_{n,n-1}$, $y_n$, $K_n$, and D, but not explicitly on $y_1 \ldots, y_{n-1}$. This recursive nature of the Kalman filter eliminates the need for storage of historical data.

It can be seen from (15) that $K_n$ has terms which are directly proportional to the elements of the covariance matrix Q and inversely proportional to the elements of R. That is, $K_n$ is, in a sense, proportional to the variability of the true process dynamics and inversely proportional to the measurement variability. Thus, it is the "Q/R" relationship which defines the responsiveness of the filter (via the K matrix) to estimated errors in state $(y_n-D_n \hat{X}_{n,n-1})$. As the elements of $K_n$ decrease (by decreasing Q or increasing R), the estimates become more stable. That is, if there is more confidence in the unbiasedness of the process model or less confidence in the observations, the filter will be designed to respond more slowly to apparent deviations from the predicted trend line. As $K_n$ increases (by increasing Q or decreasing R), estimates detect and respond to data that deviate from the assumed linear model, represented by the expected value of (8).

Thus, in summary the estimation procedure has the following steps:
 1. When n=0, the filter is initialized by a user-supplied estimate $\hat{X}_{0,0}$ of the initial state vector $X_0$ and $P_{0,0}$
 2. Using these estimates, a one-step estimate is produced using $\hat{X}_{n,n-1}=A_n \hat{X}_{n-1,n-1}$ 3. The Kalman gain matrix $K_n$ and the matrix $P_{n,n}$ are calculated
4. When a new observation is received, $\hat{X}_{n,n}=\hat{X}_{n,n-1}+K_n(y_n-D_n\hat{X}_{n,n-1})$ is used to obtain an estimate of the present state vector
5. Then using this new estimate $\hat{X}_{n,n}$, go to Step 2 and repeat process.

The algorithm continues to process new observations and produce estimates in this manner.

There are several points to be noted:
1. If the matrices D, R, A, and Q are independent of n, the gain matrix $K_n$ and the matrices P and S are independent of the observations. Thus, these matrices can be pre-calculated for use in the algorithm.
2. No past observations must be stored since all historical information is contained in the estimate $\hat{X}_{n,n}$ or equivalently via $\hat{X}_{n,n-1}=A_n\hat{X}_{n-1,n-1}$, the one-step ahead estimate.
3. Only the one-step ahead estimate must be saved to be used in the next step's process.

When the assumptions listed above about the process and measurement noises are valid and the models accurately describe the true process dynamics and the measurement system, the Kalman filter produces unbiased estimates of $\hat{X}_{n,n-1}$, that is, $E[\hat{X}_{n,n-1}]=X_{n,n-1}$. In addition, the estimates $\hat{X}_{n,n-1}$ have minimum variance in the class of all unbiased estimators.

New Technique for Characterizing the Network PDV and System Measurement (Observation) Noise Using the Sync-E Clock If the all the Kalman filter model matrices (A, D, Q, and R) are known, the algorithm is completely specified; moreover, the desirable statistical properties of the filter are assured. However, in general, the true model is not known precisely. Usually, it is the case that the processes being modeled suggest a reasonable choice of matrices A and D. Also, typically, the data characteristics can be analyzed so that Q and R are known analytically or empirically. In the present clock synchronization problem, the D matrix is known from (5) as $D_n=[2(T_{2,n}+T_{3,n})]$.

With the reference frequency available at both master and slave through the Sync-E communication link, the slave has only to correct for time offset in the face of PDV. This is still a challenging task even though the frequency alignment aspect of the problem has been solved by using Sync-E between master and slave.

From (5) and assuming the measurement noise satisfies the properties given above, the covariance of the measurement noise $v_n=(\gamma_n-\epsilon_n)$ can be expressed as $$R_n = E[v_n v_i^T] = \begin{cases} \sigma_{v,n}^2 = \sigma_{(\gamma-\epsilon),n}^2 & n=i \\ 0 & \text{otherwise} \end{cases} \quad (17)$$

which is simply the variance of the measurement error or equivalently the variance of the difference between the Delay_Req message PDVs, $\gamma_n$ and the Sync message PDVs, $\epsilon_n$. Unlike Q which is a matrix, R is not, it is just a scalar quantity.

Below a method according to an embodiment of the present invention is set out for characterizing $\epsilon_n$ and $\gamma_n$ using the PTP message flows and the Sync-E clock available at both master and slave.

Figure 10:
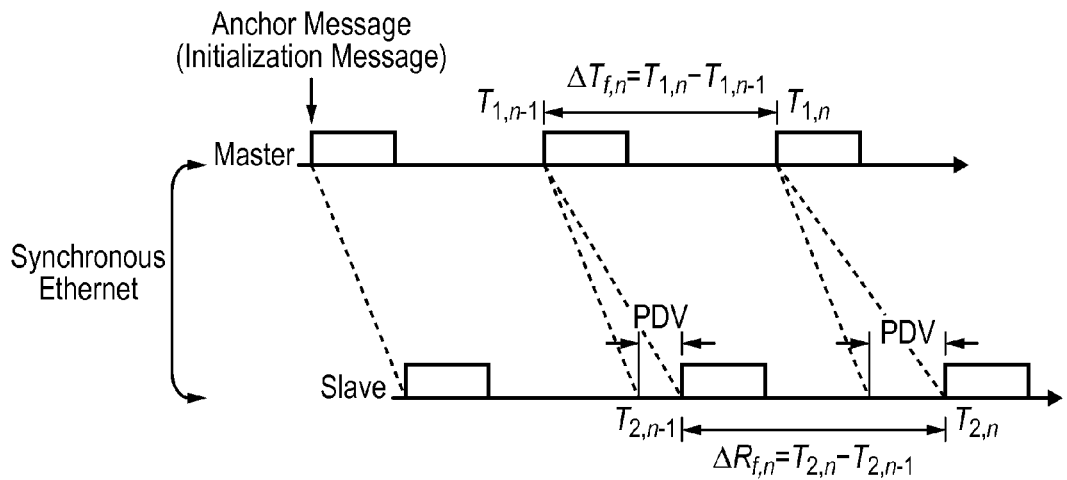
FIG. 10 shows the effect of packet delay variations in the arrival of PTP messages at a slave device.

When Sync messages are transmitted over the packet network, they will arrive at the slave with variable delay, the PDV, $\epsilon$. The Sync messages are generated using the high quality Sync-E clock available at the master. This clock is typically traceable to a Primary Reference Clock (PRC), the high quality reference clock of the network. Any arbitrary Sync message can be taken as an initialization (or anchor) message as shown in FIG. 10. The timestamp difference between the nth and (n−1)th generated Sync message at the master is defined as $\Delta T_{f,n}=T_{1,n}-T_{1,n-1}$. The timestamp difference between the nth and (n−1)th Sync message arrivals as measured by the Sync-E clock available at slave is defined as $\Delta R_{f,n}=T_{2,n}-T_{2,n-1}$. Since Sync-E clock is the same as at the master, the timestamp difference measured by the slave includes the PDV, $\epsilon_n$, experienced between the two arrivals, that is, $\epsilon_n=\Delta R_{f,n}-\Delta T_{f,n}$.

Figure 11:
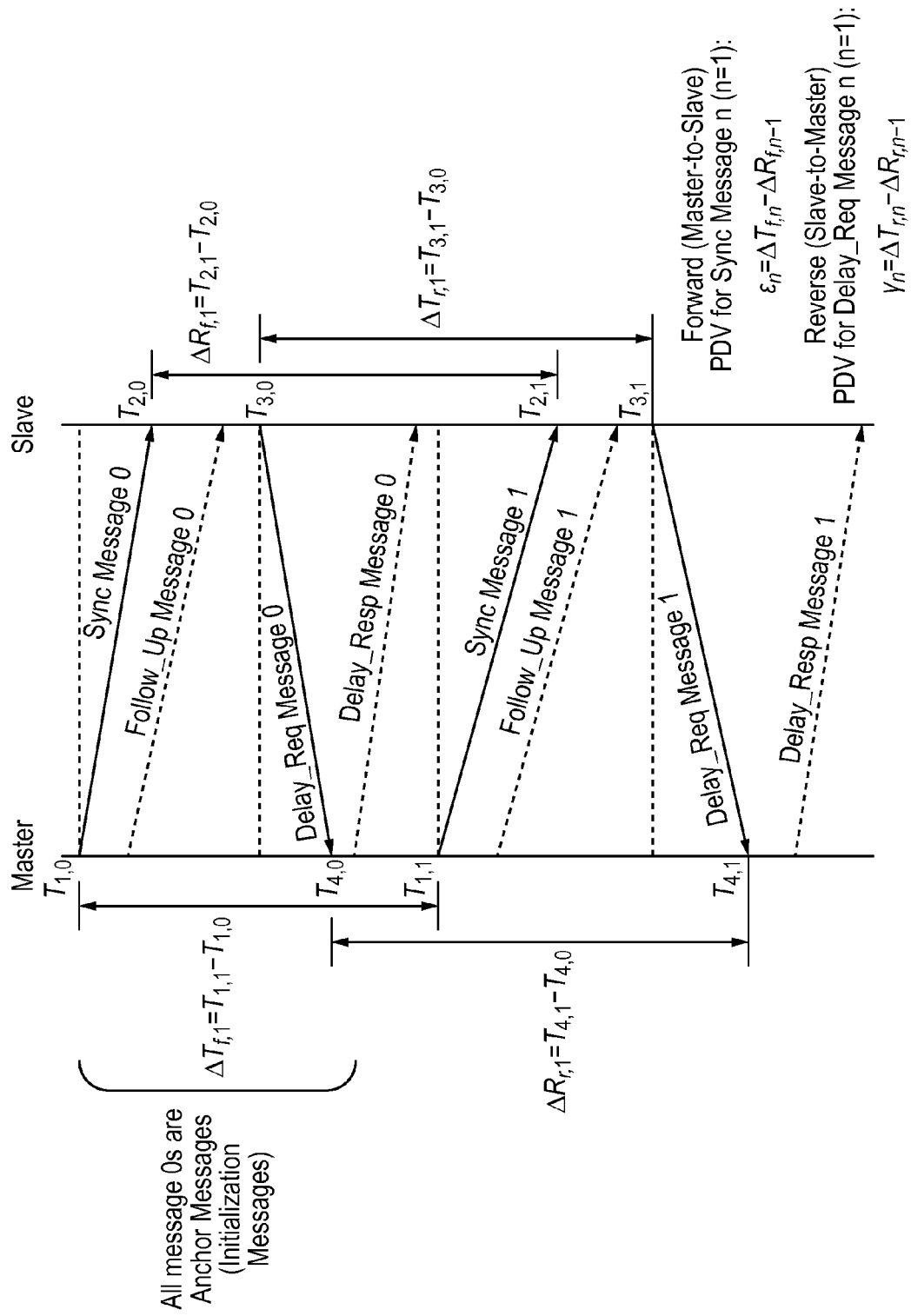
FIG. 11 shows how the packet delay variations can be measured using a synchronous Ethernet clock according to an embodiment of the present invention.

The above can be applied to Delay_Req messages transmitted from the slave to the master. The timestamp difference between the nth and (n−1)th generated Delay_Req message at the slave can be defined as $\Delta T_{r,n}=T_{3,n}-T_{3,n-1}$. The timestamp difference between the nth and (n−1)th Delay_Req message arrivals as measured by the Sync-E clock available at master is defined as $\Delta R_{r,n}=T_{4,n}-T_{4,n-1}$. The timestamp difference measured by the master includes the PDV, $\gamma_n$, experienced between the two arrivals, that is, $\gamma_n=\Delta R_{r,n}-\Delta T_{r,n}$. The calculation of the $\epsilon_n$ and $\gamma_n$ from the PTP messages is illustrated in FIG. 11.

The measurement noise can then be obtained from the forward PDV $\epsilon_n$ and the reverse PDV $\gamma_n$ as $v_n=(\gamma_n-\epsilon_n)$. The covariance of $v_n$, which simplifies to the variance $\sigma_{v,n}^2$, has to be determined to be used in the Kalman filter estimation of the clock offset. Calculating the variance of a large set of numbers, particularly from real-time data, is not trivial. It becomes more challenging when data is generated in the order of millions of numbers and even beyond. Using the naive method for calculating variance would therefore not be efficient. In the present method, the calculation of the running variance using a recursion relationship involving only the last sample is used as follows.

The following definitions are used: $\bar{v}_n$ as the running mean of $v_n$ up to discrete time n, $\mu \in (0,1)$ as a weighting parameter, and $V_n$ as the running variance of $v_n$ at time n. The running mean can be calculated using the well-known exponentially weighted moving average (EWMA) as $$\bar{v}_n = (1-\mu)\bar{v}_{n-1} + \mu v_n \quad (18)$$

In general, the variance of a finite data of size n is given by $$V_n = \frac{1}{n}\sum_{i=1}^{n}(v_i-\bar{v}_n)^2 \quad (19)$$

$$= \frac{1}{n}\left[(v_n-\bar{v}_n)^2 + \sum_{i=1}^{n-1}(v_i-\bar{v}_n)^2\right]$$

$$= \frac{1}{n}\left[(v_n-\bar{v}_n)^2 + (n-1)\frac{1}{(n-1)}\sum_{i=1}^{n-1}(v_i-\bar{v}_n)^2\right]$$

Now by setting $$V_{n-1} = \frac{1}{(n-1)}\sum_{i=1}^{n-1}(v_i-\bar{v}_n)^2,$$

in the above equation, we get $$V_n = \frac{1}{n}[(v_n - \bar{v}_n)^2 + (n-1)V_{n-1}] = \frac{1}{n}(v_n - \bar{v}_n)^2 + \left(1 - \frac{1}{n}\right)V_{n-1} \qquad (20)$$

Since n, is a positive number, 1/n will have to be a constant between 0 (if n is infinite) and 1 (if n=1). Substituting β for 1/n, we have $$V_n = \beta(v_n - \bar{v}_n)^2 + (1\beta)V_{n-1}, \qquad (21)$$

where the weighting factor $\beta \in (0,1)$. The weights μ and β can be set equal if that works well for the application. At each iteration of the Kalman filter estimation, the running variance $V_n$ is determined and then $\rho_{v,n}^2 = V_n$ is set for use in the Kalman filter.

Figure 9:
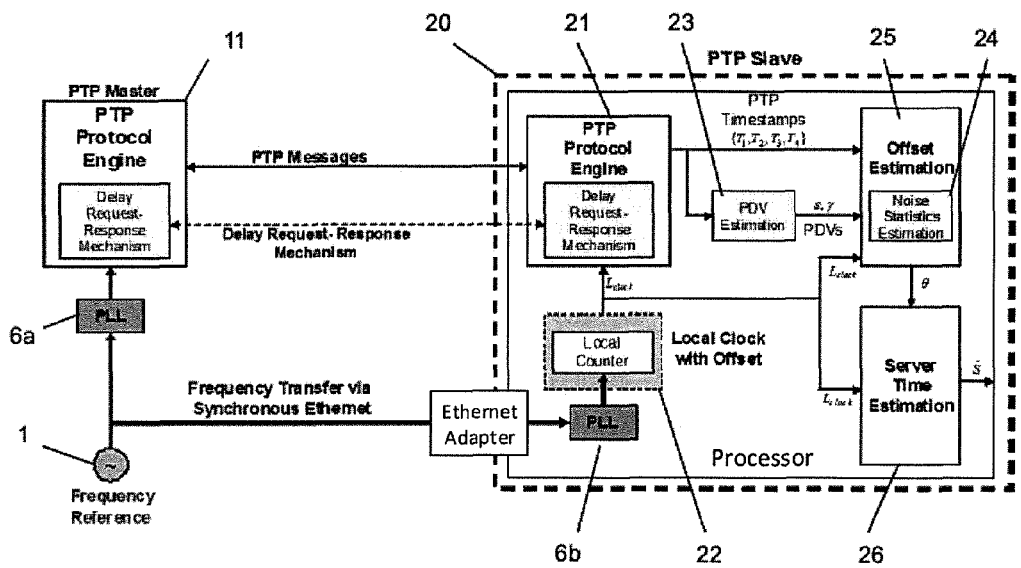
FIG. 9 shows the distribution and processing of timing information in a slave device according to an embodiment of the present invention.

FIG. 9 shows the distribution and processing of timing information in a slave device 3 according to an embodiment of the present invention. The PTP protocol engines 11, 21 in the master and slave 20 implement the delay request-response mechanism and exchange PTP messages according to FIG. 6 for the two-step clock case. Both protocol engines are driven by Sync-E clocks traceable to the frequency reference 1. The protocol engine 21 at the slave 20 outputs a set of timestamps {T1, T2, T3, T4} after each execution of the delay request-response mechanism. With a current and previous sets of timestamps {T1, T2, T3, T4}, a processor in the slave 20 extracts the relevant noise statistics (23, 24) for the Kalman filter estimation of the clock offset (25) as described above. Using the estimated clock offset and the Sync-E driven local clock 22, a processor in the slave 20 estimates the server (master) time (26).

Characterizing the Clock (Process) Noise

In this section the clock (process) model parameters A and $w_n$ are derived. The A matrix can be obtained as follows. The clock skew between two points $T_{1,n}$ and $T_{1,n-1}$ can be estimated given two clock offsets $\theta_n$ and $\theta_{n-1}$ as $$\alpha_{n-1} = \frac{\theta_n - \theta_{n-1}}{T_{1,n} - T_{1,n-1}}. \qquad (22)$$

The process dynamics for the clock while accounting for process noise can then be expressed as $$\theta_n = \theta_{n-1} + \alpha_{n-1}(T_{1,n} - T_{1,n-1}) + w_{\theta,n}$$

$$\alpha_n = \alpha_{n-1} + w_{\alpha,n} \qquad (23)$$

where $w_n^T = [w_{\theta,n}, w_{\alpha,n}]$ is the process noise vector which is assumed to be drawn from a zero mean normal distribution with covariance $Q_n = E[w_n w_n^T]$. The system can be described by the following two-state dynamic model $$X_n = \begin{bmatrix} \theta_n \\ \alpha_n \end{bmatrix} = \begin{bmatrix} 1 & (T_{1,n} - T_{1,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix} = AX_{n-1} + w_n, \qquad (24)$$

where $A_n$ is the known 2-by-2 state transition matrix. If the time between Sync messages is fixed, then, $\Delta T_n = (T_{1,n} - T_{1,n-1}) = \Delta t$ is a constant term, and we have $$A = \begin{bmatrix} 1 & (T_{1,n} - T_{1,n-1}) \\ 0 & 1 \end{bmatrix} = \begin{bmatrix} 1 & \Delta t \\ 0 & 1 \end{bmatrix}. \qquad (25)$$

The process noise covariance Q is related to the oscillator of local PLL at the slave (FIG. 7). For the Telecom clock synchronization problem, the local oscillator is typically a Temperature Compensated Crystal Oscillator (TCXO) or Oven Controlled Crystal Oscillator (OCXO).

Typically, the clock deviation of a clock is modeled by the following random differential equation $$\frac{dX(t)}{dt} = FX(t) + \xi(t), \qquad (26)$$

where F is an L×L real matrix and X(t) is the state vector $$X(t) = \begin{bmatrix} x_1(t) \\ \vdots \\ x_L(t) \end{bmatrix}. \qquad (27)$$

The quantity $x_1(t)$ represents the time deviation (or time offset) and $x_2(t)$ is part of the clock frequency deviation. In the model, $\xi(t)$ is the vector of statistically independent zero-mean white Gaussian noises, $$\xi(t) = \begin{bmatrix} \xi_1(t) \\ \vdots \\ \xi_L(t) \end{bmatrix}, \qquad (28)$$

with each element of the vector having autocorrelation $$E[\xi_k(t_1)\xi_k(t_2)] = g_k \delta(t_1 - t_2), \qquad (29)$$

for k=1, 2, . . . , L and where δ(t) is the Dirac delta function. The autocorrelation matrix of ξ(t) is thus $$E[\xi(t_1)\xi^T(t_2)] = G\delta(t_1 - t_2), \qquad (30)$$

and where G is the diagonal matrix $$G = \begin{bmatrix} g_1 & \cdots & 0 \\ \vdots & \ddots & \vdots \\ 0 & \cdots & g_L \end{bmatrix}. \qquad (31)$$

The random differential (26) can be written in the integral form $$X(t) = \Phi(t - t_0)X(t_0) + \int_{t_0}^{t} \Phi(t - \tau)\xi(\tau)d\tau, \qquad (32)$$

where $t_0$ is the initial time and Φ(t) is the transition matrix $$\Phi(t) = e^{Ft}. \qquad (33)$$

The time axis can be discretised with a sampling time Δt so that t takes the values $t_n = n\Delta t$, where n=0, 1, 2, . . . . The integral for of (32) in discrete time becomes $$X(t_n) = \Phi(\Delta t)X(t_{n-1}) + w(t_{n-1}), \qquad (34)$$

where $$w(t_{n-1}) = \int_{t_{n-1}}^{t_n} \Phi(t - \tau)\xi(\tau)d\tau, \qquad (35)$$

is a Gaussian random variable whose mean is zero and whose covariance matrix is $$Q_{n-1} = Q(t_{n-1}) \qquad (36)$$

$$= E[(w(t_{n-1}) - E[w(t_{n-1})])(w(t_{n-1}) - E[w(t_{n-1})])^T]$$

-continued $$= \int_{t_{n-1}}^{t_n}\int_{t_{n-1}}^{t_n} \Phi(t_n - \tau)E[\xi(\tau)\xi^T(s)]\Phi^T(t_n - s)\,ds\,d\tau$$

$$= \int_{t_{n-1}}^{t_n}\int_{t_{n-1}}^{t_n} \Phi(t_n - \tau)G\delta(s - \tau)\Phi^T(t_n - s)\,ds\,d\tau$$

$$= \int_{t_{n-1}}^{t_n} \Phi(t_n - \tau)G\Phi^T(t_n - \tau)\,d\tau$$

For L=2, we note that the matrix A in our clock process model (25) is $$A \approx \Phi(\Delta t) = I + F\Delta t = \begin{bmatrix} 1 & \Delta t \\ 0 & 1 \end{bmatrix}, \quad (37)$$

$$F = \begin{bmatrix} 0 & 1 \\ 0 & 0 \end{bmatrix},$$

which an approximation of a power series expansion of (33), which is $$\Phi(t) = e^{Ft} = I + F(t) + F^2\frac{t^2}{2} + F^3\frac{t^2}{6} + \ldots + F^{q-1}\frac{t^{q-1}}{(q-1)!}, \quad (38)$$

where I is the identity matrix. With L=2, and F defined in (37), the time deviation of the clock is modeled by a linear deterministic trend plus a Brownian motion and an integrated Brownian motion. From (26) we have $$\frac{dx_1(t)}{dt} = x_2(t) + \eta_1 + g_1\xi_1(t) \quad (39)$$

$$\frac{dx_2(t)}{dt} = \eta_2 + g_2\xi_2(t)$$

where we account for deterministic trends by choosing the deterministic nonzero initial conditions, represented by the constants, $\eta_1$ and $\eta_2$.

$$X(0) = \begin{bmatrix} x_1(0) \\ x_2(0) \end{bmatrix} = \begin{bmatrix} \eta_1 \\ \eta_2 \end{bmatrix} \quad (40)$$

The constants can be interpreted as the deterministic phenomena driving the clock errors.

Substituting A and G (in (31) for L=2), we have $$Q_{n-1} = Q(\Delta t) \quad (41)$$

$$= \int_0^{\Delta t} \Phi(\Delta t - \tau)G\Phi^T(\Delta t - \tau)\,d\tau$$

$$= \int_0^{\Delta t} \begin{bmatrix} 1 & (\Delta t - \tau) \\ 0 & 1 \end{bmatrix}\begin{bmatrix} g_1 & 0 \\ 0 & g_2 \end{bmatrix}\begin{bmatrix} 1 & 0 \\ (\Delta t - \tau) & 1 \end{bmatrix}d\tau$$

$$= \begin{bmatrix} \left(g_1\Delta t + \frac{g_2\Delta t^3}{3}\right) & \frac{g_2\Delta t^2}{2} \\ \frac{g_2\Delta t^2}{2} & g_2\Delta t \end{bmatrix}$$

The parameters $g_1$ and $g_2$ play the following role in the clock noise process. The parameter $g_1$ drives the white frequency noise, corresponding to a random walk on the time deviation (offset), while $g_2$ drives the frequency random walk, corresponding to an integrated random walk on the time deviation. The parameters $g_1$ and $g_2$ can also be denoted as the spectral amplitudes of $f_1$ and $f_2$, respectively, for the process model in (24). For white noise, the spectral amplitudes $g_1$ and $g_2$ can be expressed in terms of well know Allan variance parameters. The Allan variance of the frequency deviation f(t) of a clock can be computed as [1][2][3]

$$\sigma_f^2(\tau) = \frac{1}{2}\langle(\bar{f}(t+\tau) - \bar{f}(t))^2\rangle, \quad (42)$$

where $\tau>0$ is the observation interval, the operator $\langle\bullet\rangle$ denotes the time average $$\langle(\bar{f}(t+\tau) - \bar{f}(t))^2\rangle = \lim_{T\to\infty}\frac{1}{T}\int_{-T/2}^{T/2}(\bar{f}(t+\tau) - \bar{f}(t))^2\,dt, \quad (43)$$

and $\bar{f}(t)$ is the average frequency defined by $$\bar{f}(t) = \frac{1}{\tau}\int_{t-\tau}^{t} f(s)\,ds \quad (44)$$

The average frequency value and the increment ($\bar{f}(t+\tau) - \bar{f}(t)$) are therefore functions of $\tau$, in which case the Allan variance $\sigma_f^2(\tau)$ also depends on $\tau$. We note that the Allan variance of the frequency deviation f(t) of a cesium clock can be computed as [1][2][3]

$$\sigma_f^2(\tau) = \frac{g_1}{\tau} + \frac{g_2}{3}\tau, \quad (45)$$

where term containing $g_1$ is the Allan variance of the white frequency noise, while the term containing $g_2$ corresponds to the random walk frequency noise.

The Allan variance is finite for all clock noises and has the power-law behavior [4]

$$\sigma_f^2(\tau) = K_\alpha\tau^\mu, \quad (46)$$

where $K_\alpha$ is a constant. Taking the logarithm of this:

$$\log\sigma_f^2 = \log K_\alpha + \mu\log\tau, \quad (47)$$

which indicates that the Allan variance of power-law noise is a straight line in bilogarithmic coordinates. Every clock has a different signature in the Allan variance domain, which can be used to classify the different types of clocks and noises. By estimating the slopes of the Allan variance it is possible to identify the types of noise in the clock signal, and to understand possible anomalies in the stability performances.

The Allan variance is the accepted standard for the stability analysis of oscillators and is commonly used by clock manufacturers to specify the performance of their products. By taking measurable quantities such as time differences, a clock can be compared against a reference clock (with superior performance), and then the estimated deviations and noises due to the lower performance clock found. The parameters $g_1$ and $g_2$ can be determined from the Allan variance of the client clock from which the process covariance matrix Q can be calculated.

Figure 12:
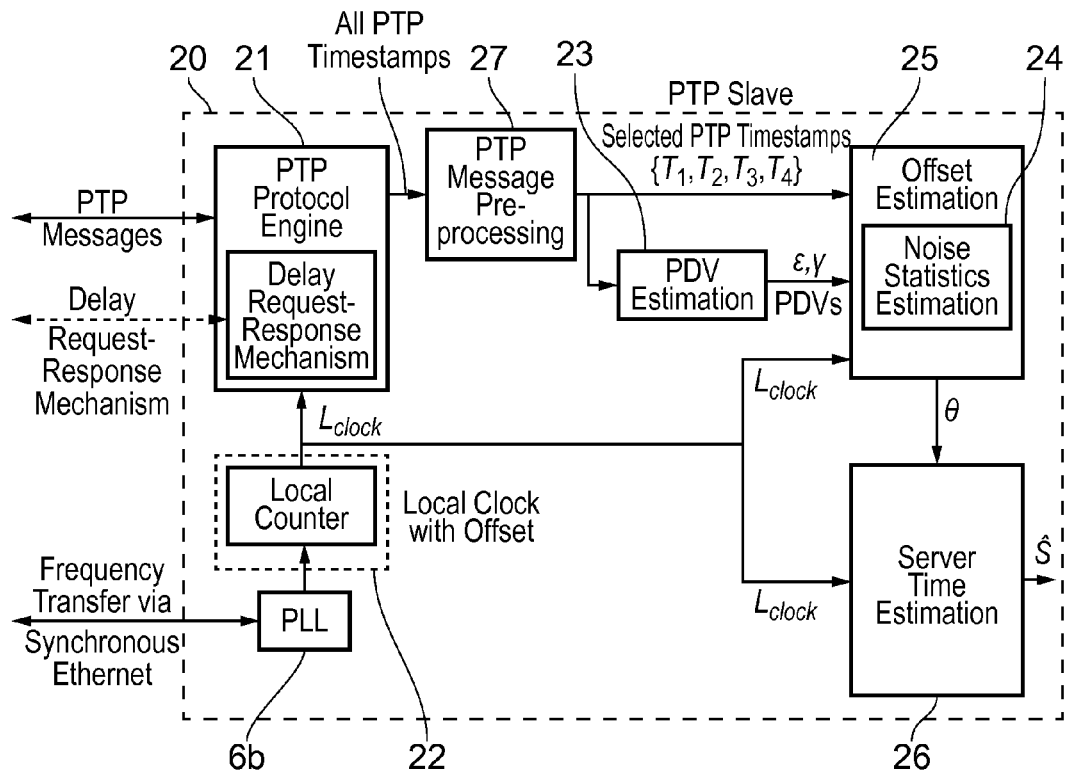
FIG. 12 shows the processing of timing information in a slave device according to an embodiment of the present invention.

Time Offset Accuracy Improvement with PTP Message Pre-Processing—Outlier Screening In this section a technique is set out which screens out unusual data or outliers in the measurement process described by (5). "Unusual data" here is defined as that representing an unusually large (outlier) measurement error ($v_n$). The importance of these types of errors is that the estimation process tends to adjust the previous estimate $\hat{X}_{n,n-1}$ in the direction of the new measurement $y_n$, with the movement being proportional to the estimated error ($y_n - D_n\hat{X}_{n,n-1}$). Therefore, without additional logic of an adaptive nature, outliers would cause overreaction to measurements. A schematic layout of the interaction of this pre-processing with the other timing synchronization features within a PTP slave device is shown in FIG. 12. The PTP slave device in FIG. 12 is essentially identical to that previously described and shown in FIG. 9, except that the PTP slave device 20 has a PTP Message Pre-processing function 27 which operates on all PTP Timestamps extracted from and applied to the PTP messages to screen out those which are considered unreliable.

Measurements are considered to be carried out over a measurement period (window) $\Delta t$ where a number of Sync and Delay_Req messages are exchanged between the master and slave. Note that $\Delta t$ here is not the time between Sync message transmissions (as described in (23) to (25)) but rather a window consisting of a number of Sync and Delay_Req transmissions. One of the following two methods can be used to select the "best" (that is, optimal or "less contaminated") Sync message and Delay_Req message among all messages exchanged in a measurement period.

1. Select a Sync Message and Delay_Req Message Belonging to the Same Protocol Exchange Pair:

Here, a representative Sync message plus its associated Delay_Req message belonging to the same protocol exchange pair are selected and their timestamps used in the estimation process of both PDV and offset elimination (as shown in FIG. 12) in order to arrive at the estimate of server time. The running variance $V_n$ described above (see Equation (21)) for the variable $v_n = (\gamma_n - \epsilon_n)$ can be used in the selection process. The goal here is to select the message pair that satisfies a screening criterion, that is, the message pair whose PDV has the minimum variance among all other message pairs in the measurement period.

2. Select a Sync Message and Delay_Req Message not Necessarily Belonging to the Same Protocol Exchange Pair:

Out of the exchanges in a window, one representative Sync message and one Delay_Req message is selected and their timestamps used in the estimation process (as shown in FIG. 12). The goal here is to select the messages that satisfy a screening criterion, that is, messages that have PDVs that carry the minimum variance among all other messages. The PDVs experienced by messages ($\epsilon_n$ and $\gamma_n$) are determined according to the procedure explained above in relation to FIG. 10 and FIG. 11. A running variance of the PDV $\epsilon_n$ is calculated for each Sync message in a sampling interval.

$$\bar{v}_{\epsilon,n} = (1-\mu)\bar{v}_{\epsilon,n-1} + \mu\epsilon_n \tag{48}$$

$$V_{\epsilon,n} = \beta(\epsilon_n - \bar{v}_{\epsilon,n})^2 + (1-\beta)V_{\epsilon,n-1} \tag{49}$$

Similarly a running variance of the PDV $\gamma_n$ is determined for each Delay_Req message.

$$\bar{v}_{\gamma,n} = (1-\mu)\bar{v}_{\gamma,n-1} + \mu\gamma_n \tag{50}$$

$$V_{\gamma,n} = \beta(\gamma_n - \bar{v}_{\gamma,n})^2 + (1-\beta)V_{\gamma,n-1} \tag{51}$$

To minimize storage of parameters, the computation of the variance is done sequentially in real-time as messages arrive in such a way that at the end of a sampling interval, only the Sync and Delay_Req messages that resulted in the minimum variance among all messages are kept. There is no need to compute running variances for all messages and then select the minimum from them. It is assumed that the client oscillator is stable enough within the sampling interval as is the case with quartz oscillators. Fortunately, a quartz oscillator (a TCXO and OCXO) is an excellent choice when short-term stability is needed. At the end of a sampling internal, a Sync message and Delay_Req message with associated timestamps are used in the estimation process.

Time Offset Computation

It is noted that the Kalman filter model (24) gives both time offset $\theta_n$ and frequency offset $\alpha_n$ estimates. However, in the present clock synchronization problem using Sync-E and PTP, frequency synchronization is already achieved (given) by Sync-E, and as a result, we expect $\alpha_n$ to converge to a small number, in the order of the accuracies of a Stratum 1 clock ($10^{-11}$). The results for $\alpha_n$ is a bonus that we get from our Kalman filter model—since the frequency offset $\alpha_n$ is part of the state vector X, we get a frequency estimate $\alpha_n$ along with the time offset estimate.

Figure 13:
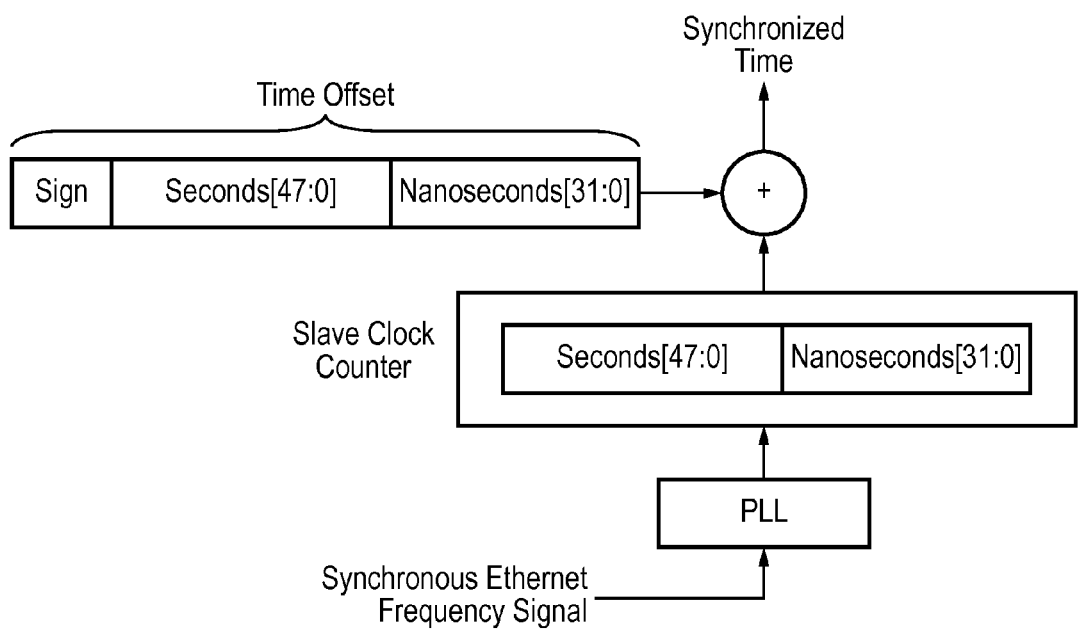
FIG. 13 shows how the slave clock can be adjusted to synchronize it with the master clock.

This quantity $\alpha_n$ can be used to verify how good the Kalman filtering estimate of the time offset is, that is, $\alpha_n$ must converge to a very small number of this order. The converged time offset value is then used to adjust the client clock to obtain and estimate of the server clock as illustrated in FIG. 13.

The systems and methods of the above embodiments may be implemented in a computer system (in particular in computer hardware or in computer software) in addition to the structural components and user interactions described.

The term "computer system" includes the hardware, software and data storage devices for embodying a system or carrying out a method according to the above described embodiments. For example, a computer system may comprise a central processing unit (CPU), input means, output means and data storage. Preferably the computer system has a monitor to provide a visual output display (for example in the design of the business process). The data storage may comprise RAM, disk drives or other computer readable media. The computer system may include a plurality of computing devices connected by a network and able to communicate with each other over that network.

The methods of the above embodiments may be provided as computer programs or as computer program products or computer readable media carrying a computer program which is arranged, when run on a computer, to perform the method(s) described above.

The term "computer readable media" includes, without limitation, any medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

In particular, although the methods of the above embodiments have been described as being implemented on the systems of the embodiments described, the methods and systems of the present invention need not be implemented in conjunction with each other, but can be implemented on alternative systems or using alternative methods respectively.

REFERENCES

[1]. A. J. Van Dierendonck and R. G. Brown, "Relationship between Allan variances and Kalman filter parameters," in *Proc. 16th Annual. Precise Time and Time Interval (PTTI) Meeting*, Greenbelt, Md., 1984, pp. 273-292.
[2]. C. Zucca and P. Tavella, "The clock model and its relationship with the Allan and related variances," *IEEE Trans. Ultrason., Ferroelect., Freq. Contr.*, vol. 52, no. 2, pp. 289-296, 2005.
[3]. W. Chaffee, "Observability, ensemble averaging and GPS time," *IEEE Trans. Aerosp. Electron. Syst.*, vol. 28, no. 1, pp. 224-240, 1992.
[4]. D. W. Allan, "Statistics of atomic frequency standards," *Proc. IEEE*, vol. 54, no. 2, pp. 221-230, 1966.

All references referred to above are hereby incorporated by reference.

The invention claimed is:

1. A method of synchronising the frequency and time of a slave clock in a slave device to a master clock in a master device, wherein the master device and the slave device are connected by an Ethernet network, the method including the steps of:
    synchronising the frequency of the slave clock to that of the master clock using Synchronous Ethernet communications between the master device and the slave device;
    receiving in the slave device first and second timing messages sent from the master device and respective first and second timestamps being the time of sending of the first and second messages according to the master clock, and recording the time of receipt of the first and second messages according to the slave clock;
    calculating, via the slave device, forward variable delay encountered by the first and second messages in travelling from the master device to the slave device over the network by comparing the difference between the interval between the time of sending of said first and second messages and the interval between the time of receipt of said first and second messages;
    receiving in the master device third and fourth timing messages sent from the slave device and recording the time of receipt of the third and fourth messages according to the master clock;
    recording in the slave device the time of sending of the third and fourth messages according to the slave clock;
    sending the recorded time of receipt of the third and fourth messages to the slave device;
    calculating, via the slave device, reverse variable delay encountered by the third and fourth messages in travelling from the slave device to the master device over the network by comparing the difference between the interval between the time of sending said third and fourth messages and the interval between the time of receipt of said third and fourth messages;
    calculating, via the slave device, from the forward and reverse variable delays, a measure of noise associated with both the receipt of the first and second timing messages and receipt of third and fourth timing messages;
    estimating the variance of the measurement noise; and
    adjusting the actual time of the slave clock to synchronize it with the time of the master using the first and third timestamps, the recorded times of receipt of the first and third messages and the estimated variance.

2. A method according to claim 1 wherein the timing messages are messages according to the IEEE 1588 Precision Time Protocol, and the first and second timing messages are Sync messages and the third and fourth messages are Delay_Req messages.

3. A method according to claim 1 wherein the step of adjusting the actual time of the slave clock uses a linear Kalman filter to update a state equation representing the offset and skew of the slave clock compared to the master clock using the estimated variance of the measurement noise following receipt of each timing message in the slave device.

4. A method according to claim 3, further including the steps of, prior to adjusting the actual time of the slave clock, determining the skew of the slave clock according to the updated state equation, and only proceeding to adjust the actual time of the slave clock based on the updated state equation if the skew is less than a predetermined level.

5. A method according to claim 1 wherein the step of estimating the variance of the measurement noise calculates a running variance in a recursive manner using the previous estimate of the variance and the calculated measurement noise.

6. A method according to claim 1 further including the step of, prior to steps of estimating the variance of the measurement noise and adjusting the actual time of the slave clock, screening out data having unusually large measurement noise.

7. A slave device connected to a master device having a master clock over an Ethernet network having multiple conceptual layers, wherein the slave device includes:
    a slave clock;
    an Ethernet adapter; and
    a processor, wherein:
    the Ethernet adapter is arranged to receive, at a physical layer of the Ethernet network, timing signals from the master device via Synchronous Ethernet and the processor synchronises the frequency of the slave clock to the frequency of the master clock using those timing signals; and
    the Ethernet adapter is arranged to receive, through a layer above the physical layer, first and second timing messages sent from the master device and respective first and second timestamps being the time of sending of the first and second messages according to the master clock, and to record the time of receipt of the first and second messages according to the slave clock; and further wherein
    the processor is arranged to:
        calculate forward variable delay encountered by the first and second messages in travelling from the master device to the slave device over the network by comparing the difference between the interval between the time of sending of said first and second messages and the interval between the time of receipt of said first and second messages;
        send third and fourth timing messages to the master device for the master device to record the time of receipt of the third and fourth messages according to the master clock;
        record the time of sending of the third and fourth messages according to the slave clock;

receive, from the master device, the recorded time of receipt of the third and fourth messages;

calculate reverse variable delay encountered by the third and fourth messages in travelling from the slave device to the master device over the network by comparing the difference between the interval between the time of sending said third and fourth messages and the interval between the time of receipt of said third and fourth messages;

calculate, from the forward and reverse variable delays, a measure of noise associated with both the receipt of the first and second timing messages and receipt of third and fourth timing messages;

estimate the variance of the measurement noise; and adjust the actual time of the slave clock to synchronize it with the time of the master using the first and third timestamps, the recorded times of receipt of the first and third messages and the estimated variance.

8. A slave device according to claim 7 wherein the timing messages are messages according to the IEEE 1588 Precision Time Protocol, and the first and second timing messages are Sync messages and the third and fourth messages are Delay_Req messages.

9. A slave device according to claim 7 wherein the processor adjusts the actual time of the slave clock by using a linear Kalman filter to update a state equation representing the offset and skew of the slave clock compared to the master clock using the estimated variance of the measurement noise following receipt of each timing message in the slave device.

10. A slave device according to claim 9 wherein the processor determines the skew of the slave clock according to the updated state equation, and only adjusts the actual time of the slave clock based on the updated state equation if the skew is less than a predetermined level.

11. A slave device according to claim 7 wherein the processor estimates the variance of the measurement noise by calculating a running variance in a recursive manner using the previous estimate of the variance and the calculated measurement noise.

12. A slave device according to claim 7 wherein the processor screens out data having unusually large measurement noise prior to making its estimate of the variance of the measurement noise and adjusting the actual time of the slave clock.

13. A system for synchronising the frequency and time of a slave clock in a slave device to a master clock in a master device, the system including:

the master device having the master clock and a first Ethernet adapter;

the slave device having the slave clock, a second Ethernet adapter and a processor; and an Ethernet network connecting the master device and the slave device, wherein:

the first Ethernet adapter is arranged to send, at a physical layer of an Ethernet network, timing signals based on said master clock using the Synchronous Ethernet protocol;

the second Ethernet adapter is arranged to receive, at the physical layer, said timing signals from the master device and the processor synchronises the frequency of the slave clock to the frequency of the master clock using those timing signals;

the master device is arranged to send, through the first Ethernet adapter, using a layer above the physical layer, first and second timing messages and respective first and second timestamps being the time of sending of the first and second messages according to the master clock;

the second Ethernet adapter is arranged to receive, through a layer above the physical layer, said first and second timing messages and said first and second timestamps, and to record the time of receipt of the first and second messages according to the slave clock;

the slave device is arranged to send, through the second Ethernet adapter, using a layer above the physical later, third and fourth timing messages, and to record the time of sending of the third and fourth messages according to the slave clock;

the first Ethernet adapter is arranged to receive, through a layer above the physical layer, said third and fourth timing messages and sent from the slave device and to record the time of receipt of the third and fourth messages according to the master clock and send the recorded time of receipt of the third and fourth messages to the slave device;

and further wherein the processor in the slave device is arranged to:

calculate the forward variable delay encountered by the first and second messages in travelling from the master device to the slave device over the network by comparing the difference between the interval between the time of sending of said first and second messages and the interval between the time of receipt of said first and second messages;

calculate the reverse variable delay encountered by the third and fourth messages in travelling from the slave device to the master device over the network by comparing the difference between the interval between the time of sending said third and fourth messages and the interval between the time of receipt of said third and fourth messages;

calculate, from the forward and reverse variable delays, a measure of noise associated with both the receipt of the first and second timing messages and receipt of third and fourth timing messages;

estimate the variance of the measurement noise; and adjust the actual time of the slave clock to synchronize it with the time of the master using the first and third timestamps, the recorded times of receipt of the first and third messages and the estimated variance.

14. A system according to claim 13 wherein the timing messages are messages according to the IEEE 1588 Precision Time Protocol, and the first and second timing messages are Sync messages and the third and fourth messages are Delay_Req messages.

15. A system according to claim 13 wherein the processor adjusts the actual time of the slave clock by using a linear Kalman filter to update a state equation representing the offset and skew of the slave clock compared to the master clock using the estimated variance of the measurement noise following receipt of each timing message in the slave device.

16. A system according to claim 15 wherein the processor determines the skew of the slave clock according to the updated state equation, and only adjusts the actual time of the slave clock based on the updated state equation if the skew is less than a predetermined level.

17. A system according to claim 13 wherein the processor estimates the variance of the measurement noise by calculating a running variance in a recursive manner using the previous estimate of the variance and the calculated measurement noise.

18. A system according to claim 13 wherein the processor screens out data having unusually large measurement noise prior to making its estimate of the variance of the measurement noise and adjusting the actual time of the slave clock.

* * * * *